(12) United States Patent
Iwai et al.

(10) Patent No.: US 10,178,630 B2
(45) Date of Patent: *Jan. 8, 2019

(54) TERMINAL APPARATUS, BASE STATION AND COMMUNICATION METHOD

(71) Applicant: Sun Patent Trust, New York, NY (US)

(72) Inventors: Takashi Iwai, Ishikawa (JP); Daichi Imamura, Beijing (CN); Masayuki Hoshino, Kanagawa (JP); Akihiko Nishio, Osaka (JP); Takashi Tamura, Kanagawa (JP); Kazuki Takeda, Kanagawa (JP)

(73) Assignee: Sun Patent Trust, New York, NY (US)

( * ) Notice: Subject to any disclaimer, the term of this patent is extended or adjusted under 35 U.S.C. 154(b) by 104 days.

This patent is subject to a terminal disclaimer.

(21) Appl. No.: 15/341,786

(22) Filed: Nov. 2, 2016

(65) Prior Publication Data

US 2017/0078980 A1    Mar. 16, 2017

Related U.S. Application Data

(63) Continuation of application No. 14/113,651, filed as application No. PCT/JP2012/004253 on Jun. 29, 2012, now Pat. No. 9,516,605.

(30) Foreign Application Priority Data

Jul. 13, 2011    (JP) ................................. 2011-154885
Apr. 27, 2012    (JP) ................................. 2012-102744

(51) Int. Cl.
*H04W 4/00*    (2018.01)
*H04W 52/04*    (2009.01)
(Continued)

(52) U.S. Cl.
CPC ......... *H04W 52/246* (2013.01); *H04L 1/0077* (2013.01); *H04L 5/0048* (2013.01);
(Continued)

(58) Field of Classification Search
CPC ...... H04B 7/024; H04B 7/208; H04B 7/2621; H04W 16/24; H04W 16/32;
(Continued)

(56) References Cited

U.S. PATENT DOCUMENTS 7,248,889 B2    7/2007    Schwartz et al.
7,570,968 B2    8/2009    Huh et al.
(Continued)

FOREIGN PATENT DOCUMENTS

WO    2010/107880 A2    9/2010
WO    2010/124241 A2    10/2010
(Continued)

OTHER PUBLICATIONS

Ericsson, ST-Ericsson, Samsung, Nokia Siemense Networks, Nokia Corporation, NTT DOCOMO, MediaTek, "Discussions on physical layer parameters to be configured by RRC", Tdoc R2-110610, 3GPP TSG-RAN WG2 #72bis, Agenda Item: 7.1.3, Dublin, Ireland, Jan. 17-21, 2011, 12 pages.

(Continued)

*Primary Examiner* — Alpus Hsu
(74) *Attorney, Agent, or Firm* — Seed IP Law Group LLP

(57) ABSTRACT

Provided is a terminal apparatus in which, a transmission control unit (204) controls the transmission power of a sounding reference signal (SRS) by use of an offset value relative to the transmission power of a data signal, and a transmission unit (206) transmits the SRS by use of the transmission power as controlled. If a subframe to be used for transmitting the SRS is a predetermined subframe, the transmission control unit (204) uses a first offset value to (Continued)

control the transmission power of the SRS. Otherwise, the transmission control unit (204) uses a second offset value to control the transmission power of the SRS. The second offset value is an offset value that has been established so as to be transmitted to the serving cell of the terminal (200), and the first offset value is greater than the second offset value.

18 Claims, 15 Drawing Sheets

(51) Int. Cl.
| | |
|---|---|
| H04W 72/04 | (2009.01) |
| H04W 52/24 | (2009.01) |
| H04W 52/32 | (2009.01) |
| H04L 5/00 | (2006.01) |
| H04L 1/00 | (2006.01) |
| H04W 52/14 | (2009.01) |
| H04W 52/40 | (2009.01) |
| H04B 7/024 | (2017.01) |
| H04W 52/16 | (2009.01) |
| H04W 88/02 | (2009.01) |

(52) U.S. Cl.
CPC ....... *H04W 52/244* (2013.01); *H04W 52/325* (2013.01); *H04B 7/024* (2013.01); *H04W 52/146* (2013.01); *H04W 52/16* (2013.01); *H04W 52/242* (2013.01); *H04W 52/40* (2013.01); *H04W 88/02* (2013.01)

(58) Field of Classification Search
CPC ........... H04W 28/0231; H04W 52/146; H04W 52/16; H04W 52/325; H04W 52/40; H04W 52/54; H04W 88/02
See application file for complete search history.

(56) References Cited

U.S. PATENT DOCUMENTS

| | | | |
|---|---|---|---|
| 7,738,908 B2 | 6/2010 | Huh et al. |
| 8,005,499 B2 | 8/2011 | Wigard et al. |
| 8,019,373 B2 | 9/2011 | Cho et al. |
| 8,135,429 B2 | 3/2012 | Kuroda et al. |
| 8,259,700 B2 | 9/2012 | Li et al. |
| 8,271,014 B2 | 9/2012 | Gholmieh et al. |
| 8,447,343 B2 | 5/2013 | Gerstenberger et al. |
| 8,489,100 B2 | 7/2013 | Vajapeyam et al. |
| 8,537,734 B2 | 9/2013 | Gu et al. |
| 8,554,257 B2 | 10/2013 | Hannu et al. |
| 8,565,168 B2 | 10/2013 | Papasakellariou et al. |
| 8,724,492 B2 | 5/2014 | Frank et al. |
| 8,811,322 B2 | 8/2014 | Feuersanger et al. |
| 8,812,045 B2 | 8/2014 | Kim et al. |
| 8,824,349 B2 | 9/2014 | Nakashima et al. |
| 8,824,391 B2 | 9/2014 | Yang et al. |
| 8,873,443 B2 | 10/2014 | Haim et al. |
| 9,055,535 B2 | 6/2015 | Iwai et al. |
| 9,055,585 B2* | 6/2015 | Lohr ................... H04L 1/0026 |
| 9,179,424 B2* | 11/2015 | Feuersaenger ........ H04L 5/0007 |
| 9,191,899 B2* | 11/2015 | Kim ................... H04W 52/146 |
| 9,532,315 B2* | 12/2016 | Iwai ................... H04W 52/16 |
| 2001/0028638 A1 | 10/2001 | Walton et al. |
| 2008/0280638 A1 | 11/2008 | Malladi et al. |
| 2009/0318183 A1 | 12/2009 | Hugl et al. |
| 2011/0098054 A1 | 4/2011 | Gorokhov et al. |
| 2011/0159914 A1* | 6/2011 | Chen ................... H04W 52/362 455/522 |
| 2011/0199944 A1 | 8/2011 | Chen et al. |
| 2011/0261716 A1 | 10/2011 | Kim et al. |
| 2011/0306383 A1 | 12/2011 | Lee et al. |
| 2012/0014349 A1 | 1/2012 | Chung et al. |
| 2012/0176915 A1 | 7/2012 | Lee et al. |
| 2012/0176998 A1 | 7/2012 | Muellner et al. |
| 2012/0238313 A1 | 9/2012 | Zhou et al. |
| 2013/0012252 A1 | 1/2013 | Suzuki et al. |
| 2013/0078913 A1 | 3/2013 | Lee et al. |
| 2013/0121279 A1 | 5/2013 | Noh et al. |
| 2013/0242911 A1 | 9/2013 | Heo et al. |
| 2013/0250847 A1 | 9/2013 | Lee et al. |
| 2014/0113677 A1 | 4/2014 | Parkvall et al. |

FOREIGN PATENT DOCUMENTS

| | | |
|---|---|---|
| WO | 2011/041555 A2 | 4/2011 |
| WO | 2011/155711 A2 | 12/2011 |

OTHER PUBLICATIONS

3GPP TS 36.213 V10.0.1, 3rd Generation Partnership Project; Technical Specification Group Radio Access Network; Evolved Universal Terrestrial Radio Access (E-UTRA); Physical layer procedures (Release 10), Dec. 2010, 98 pages.
Extended European Search Report dated Oct. 27, 2014, for corresponding EP Application No. 12812136.5-1855 / 2693813, 7 pages.
Pantech, "Remaining issues on Aperodic SRS triggering," R1-111646, 3GPP TSG RAN1 #65, Agenda Item: 6.2.2, Barcelona, Spain, May 9-13, 2011, 3 pages.
Samsung, "Discussions on CSI-RS port selection for non-uniform networks with low power nodes," R1-111469, 3GPP TSG-RAN1#65 meeting, Agenda Item: 6.3.2.2, Barcelona, Spain, May 9-13, 2011, 3 pages.
Samsung, "Simultaneous SRS transmissions in more than one CC," R1-111455, 3GPP TSG-RAN1#65 meeting, Agenda Item: 6.2.1, Barcelona, Spain, May 9-13, 2011, 3 pages.
Samsung, "UL Transmission Power Control in LTE-A," R1-093395, 3GPP TSG RAN WG1 #58, Agenda Item: 15.4, Shenzhen, China, Aug. 24-28, 2009, 5 pages.
International Search Report dated Oct. 2, 2012, for corresponding International Application No. PCT/JP2012/004253, 2 pages. (W/ English Translation).

\* cited by examiner

TERMINAL APPARATUS, BASE STATION AND COMMUNICATION METHOD

BACKGROUND

Technical Field

The present disclosure relates to a terminal apparatus, a base station and a communication method.

Description of the Related Art

In 3GPP-LTE (3rd Generation Partnership Project Radio Access Network Long Term Evolution, hereinafter, referred to as "LTE") uplink, periodic sounding reference signals (P-SRS) are used as reference signals (SRS (sounding reference signal)) to measure uplink receiving quality.

Furthermore, in LTE, an SRS transmission subframe (hereinafter, referred to as "common SRS subframe") which is common to all terminal apparatuses (hereinafter, simply referred to as "terminal" or also referred to as "UE (User Equipment)") is configured. This common SRS subframe is defined by a combination of a predetermined periodicity and a subframe offset on a per-cell basis. In addition, the information on the common SRS subframe is broadcasted to terminals within the cell. For example, when the periodicity is equal to 10 subframes and the offset is 3, the third subframe in a frame (consisting of 10 subframes) is configured as a common SRS subframe. In a common SRS subframe, all the terminals within the cell stop transmission of data signals in the last symbol of the subframe and use the period as the resources for SRS transmission (reference signals) (hereinafter referred to as "SRS resources").

Meanwhile, subframes for SRS transmissions are individually configured for terminals by a higher layer (i.e., RRC layer higher than the physical layer) (hereinafter, referred to as individual SRS subframe). Each terminal transmits an SRS in the configured individual SRS subframe. In addition, parameters for SRS resources (hereinafter, may be referred to as "SRS resource parameters") are configured and indicated to each terminal. The SRS resource parameters include the bandwidth, bandwidth position (or SRS bandwidth starting position), cyclic shift and comb (corresponding to identification information on the subcarrier group) of the SRS, for example. The terminal transmits an SRS using the resources specified by the indicated parameters. Additionally, SRS frequency-hopping may be configured.

Next, conventional (LTE Rel.10) SRS transmission power control will be described.

Transmission power $P_{SRS,c}(i)$ of an SRS in subframe #i of serving cell #c is calculated according to following equation 1 as described in NPL 1. The serving cell is a cell that indicates control information to a terminal in communication.

[1]

$$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\}$$ (Equation 1)

In equation 1, $P_{CMAX,c}$ [dBm] represents maximum transmission power of SRS that can be transmitted by a terminal, $P_{SRS\_OFFSET,c}(m)$ [dB] represents an offset value of transmission power of SRS with respect to transmission power of PUSCH transmitted by the terminal (parameter set from a base station apparatus (hereinafter, may be simply referred to as "base station" or may also be referred to as "eNB")), $M_{SRS,c}$ represents the number of frequency resource blocks assigned to SRS, $P_{O\_PUSCH,c}(j)$ [dBm] represents an initial value of transmission power of PUSCH (parameter set from the base station), $PL_c$ represents a path loss level [dB] measured by the terminal, $\alpha_c(j)$ represents a weighting factor representing a compensation ratio of the path loss ($PL_c$) (parameter set from the base station), and $f_c(i)$ represents a cumulative value in subframe #i including past values of TPC (transmission power control) command (control value, for example, +3 dB, +1 dB, 0 dB, −1 dB) subject to closed loop control. In $P_{SRS\_OFFSET,c}(m)$, values are set for m=0, 1 respectively. To be more specific, a parameter value of m=0 is used in the case of Type 0 SRS (also referred to as "P-SRS") in $P_{SRS\_OFFSET,c}(m)$ or a parameter value of m=1 is used in the case of Type 1 SRS (also referred to as "aperiodic SRS (A-SRS)"). $P_{SRS\_OFFSET,c}(m)$ is expressed in step widths of 1.5 [dB] within a setting range of −10.5 [dB] to 12.0 [dB]. That is, $P_{SRS\_OFFSET,c}(m)$ is expressed by 4 bits. Furthermore, values are set in $P_{O\_PUSCH,c}(j)$ and $\alpha_c(j)$ for j=0, 1, 2, respectively.

Here, the path loss ($PL_c$) is a value measured by a terminal using reference signals transmitted by a serving cell of the terminal and is calculated according to following equation 2.

[2]

$$PL_c = \text{referenceSignalPower} - RSRP$$ (Equation 2)

In equation 2, referenceSignalPower represents a transmission power value of a reference signal of a serving cell indicated from the serving cell, and RSRP (reference signal received power) represents receiving power of a reference signal calculated by a terminal using a filter coefficient (averaged length) indicated from the serving cell.

In the uplink of LTE-Advanced, which is an evolved version of LTE, aperiodic SRS (hereinafter referred to as "A-SRS") is used in addition to P-SRS introduced from LTE. This A-SRS transmission timing is controlled by trigger information (e.g., 1-bit information). The trigger information is transmitted from the base station to the terminal using a control channel of the physical layer (that is, PDCCH). That is, the terminal transmits A-SRS only when A-SRS transmission is requested by trigger information (that is, A-SRS transmission request). Studies are underway to assume the A-SRS transmission timing to be a first common SRS subframe four subframes after the subframe in which the trigger information is transmitted. As described above, P-SRS is periodically transmitted, while A-SRS can be transmitted to the terminal for a short period in a concentrated manner only when uplink transmission data is generated in bursts.

In LTE-Advanced, studies are being carried out on a heterogeneous network (HetNet) using a plurality of base stations having coverage areas of different sizes. Furthermore, in LTE-Advanced, studies are underway to apply CoMP (coordinated multiple point transmission and reception), which is a communication scheme in which a plurality of cells (base stations) cooperate to transmit data to a terminal for the purpose of improving mainly the throughput of a user located on a cell edge in a heterogeneous network.

The heterogeneous network is a network jointly using a macro base station that covers a large coverage area (hereinafter, may also be referred to as "macro cell" or "macro eNB" or "HPN (high power node)") and a pico base station that covers a small coverage area (hereinafter, may also be referred to as "pico cell" or "pico eNB" or "LPN (low power node)"). For example, in the operation of a heterogeneous network, a pico eNB having small transmission power is installed in a coverage area of a macro eNB having large transmission power, and the macro eNB and the pico eNB are connected together using a cable (an optical fiber or the like). Studies are underway to apply downlink CoMP (downlink CoMP) in which the pico eNB and the macro eNB cooperatively transmit data signals to a pico terminal (pico UE, terminal controlled by the pico eNB) in such a heterogeneous network environment (see FIG. 1).

In a system using CoMP, studies are underway to perform CoMP control in accordance with a propagation path condition such as selection of an optimum transmission point or selection of a transmission weight from among a plurality of cells (base stations) using reference signals (e.g., P-SRS and A-SRS) for measuring uplink channel quality from the terminal to the base station (e.g., see NPL 2).

A plurality of base stations such as a macro eNB and pico eNB receive SRS transmitted from a terminal and measure channel quality (e.g., SINR) (see FIG. 2). SINR measured values of the base stations (that is, propagation path conditions between the base stations and the terminal) are compared and an optimum transmission point in downlink CoMP is thereby determined.

When CoMP is applied in a TDD (time division duplex) system, a plurality of base stations can estimate downlink channel responses from uplink channel responses (channel quality) at the respective base stations calculated from SRS using reversibility of the propagation path. In this case, estimate values of downlink channel responses in the respective base stations are compared, and an optimum transmission point and transmission weight in downlink CoMP are determined.

In a system that applies CoMP in a heterogeneous network environment, a pico UE is located within the coverage area of a macro eNB (can receive transmission signals of the macro eNB). For this reason, not only a pico eNB but also a macro eNB can be selected as a transmission point for the pico UE. That is, when channel quality between the pico UE and the macro eNB is good, it is possible to improve the downlink throughput performance by transmitting data from the macro eNB which is not the serving cell of the pico UE to the pico UE in a coordinated manner.

CITATION LIST

Non-Patent Literatures

NPL 1
3GPP TS36.213 v10.0.1 (section 5.1), "3GPP TSGRAN E-UTRA Physical layer procedures (Release 10)," December 2010
NPL 2
3GPP TSG RAN WG1 meeting, R1-111469, Samsung, "Discussions on CSI-RS port selection for non-uniform networks with low-power nodes", May 2011

BRIEF SUMMARY

Technical Problem

In consideration of application of CoMP in a heterogeneous network environment, the aforementioned transmission power control of SRS involves the following problems.

Considering the fact that the macro eNB can also be selected as a transmission point for the pico UE, the macro eNB needs to accurately measure channel quality between the pico UE and the macro eNB using SRS transmitted from the pico UE in order to achieve the effect of improving the system performance by applying CoMP.

In contrast, under the aforementioned transmission power control of SRS, the pico UE transmits SRS with transmission power in accordance with a path loss of the pico eNB which is the serving cell. That is, as shown in FIG. 3, the pico UE controls transmission power of SRS based on the path loss of the pico eNB so that receiving power of SRS at the pico eNB becomes a target level. For this reason, as shown in FIG. 3, since the distance of the macro eNB from the pico UE is greater than the distance from the pico eNB, the path loss corresponding to a signal transmitted from the pico UE is greater than that of the pico eNB. Thus, at a reception point of the macro eNB as shown in FIG. 3, the reception level of SRS transmitted from the pico UE is lower than the target level, and channel quality measurement accuracy between the pico UE and the macro eNB deteriorates.

To be more specific, when the reception level of SRS at the macro eNB is lower than a noise level, a large error (difference between input SINR and measured SINR) may occur in channel quality (e.g., SINR measured value) due to the influence of noise. For example, FIG. 4 shows a computer simulation result illustrating a relationship of an average value and variance of the measured SINR versus an input SINR. As shown in FIG. 4, it is clear that the lower the input SINR (reception SINR of SRS), the greater the influence of noise and the greater the SINR measurement error (difference between the input SINR and the measured SINR). For example, in FIG. 4, in order to reduce the measurement error of SINR and thus to secure channel quality estimating accuracy, the base station needs to receive SRS in a region where the influence of noise decreases (e.g., region where input SINR is 5 dB or higher).

As described above, base stations such as macro eNB and pico eNB estimate channel quality based on an SINR measured value measured using SRS transmitted from a terminal and thereby perform CoMP control. For this reason, when the measurement error of SINR is large, a base station having poor channel quality may be erroneously selected as a transmission point. Similarly, when the measurement error of SINR is large, an inappropriate transmission weight may be selected. As shown above, when the measurement error of SINR is large, the effect of improving the system performance by applying CoMP decreases due to deterioration of channel quality measurement accuracy, and the system performance may conversely deteriorate because of application of CoMP.

Meanwhile, in order to increase the input SINR in a base station, it is necessary to increase transmission power of SRS in a terminal. For example, SRS transmission power control of a terminal may be performed using a minimum necessary input SINR (e.g., SINR=5 dB in FIG. 4) to secure the channel quality measurement accuracy in a base station as a target level. However, when the terminal increases the transmission power of SRS, power consumption of the terminal increases, and interference provided to other cells (hereinafter, referred to as other cell interference) increases.

An object of the present disclosure is to provide a terminal apparatus, a base station and a communication method capable of limiting increases in power consumption in the terminal and increases in other cell interference.

Solution to Problem

A terminal apparatus according to an aspect of the present disclosure includes: a control section that controls transmission power of a sounding reference signal (SRS) using an offset value corresponding to transmission power of a data signal; and a transmitting section that transmits the SRS with the transmission power, in which: the control section controls the transmission power of the SRS using a first offset value when an SRS transmission subframe is a predetermined subframe, and the control section controls the transmission power of the SRS using a second offset value when the transmission subframe is a subframe other than the predetermined subframe; and the second offset value is an offset value set for transmission to a serving cell, and the first offset value is greater than the second offset value.

A base station apparatus according to an aspect of the present disclosure includes: a determining section that determines an offset value corresponding to transmission power of a data signal for a terminal apparatus; and a receiving section that receives a sounding reference signal (SRS) with transmission power controlled using the offset value, in which: the determining section determines a first offset value to be used for SRS transmission, when an SRS transmission subframe is a predetermined subframe, and a second offset value to be used for SRS transmission, when the transmission subframe is a subframe other than the predetermined subframe; and the second offset value is an offset value set for transmission to a serving cell of the terminal apparatus, and the first offset value is greater than the second offset value.

A transmission method according to an aspect of the present disclosure includes: controlling transmission power of a sounding reference signal (SRS) using an offset value corresponding to transmission power of a data signal; and transmitting the SRS with the transmission power, in which: the transmission power of the SRS is controlled using a first offset value when an SRS transmission subframe is a predetermined subframe, and the transmission power of the SRS is controlled using a second offset value when the transmission subframe is a subframe other than the predetermined subframe; and the second offset value is an offset value set for transmission to a serving cell, and the first offset value is greater than the second offset value.

A reception method according to an aspect of the present disclosure includes: determining an offset value corresponding to transmission power of a data signal for a terminal apparatus; receiving a sounding reference signal (SRS) with transmission power controlled using the offset value; and determining a first offset value to be used for SRS transmission, when an SRS transmission subframe is a predetermined subframe, and determining a second offset value to be used for SRS transmission, when the transmission subframe is a subframe other than the predetermined subframe, in which the second offset value is an offset value set for transmission to a serving cell of the terminal apparatus, and the first offset value is greater than the second offset value.

Advantageous Effects of Disclosure

According to the present disclosure, it is possible to limit increases in power consumption in a terminal and increases in other cell interference.

DETAILED DESCRIPTION

Figure 1:
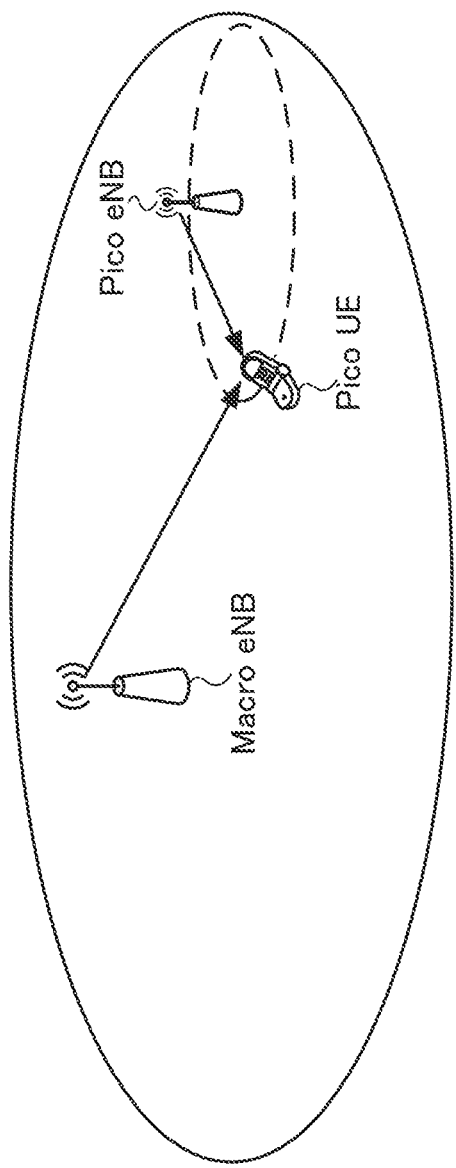
FIG. 1 illustrates CoMP transmission in downlink.
Figure 2:
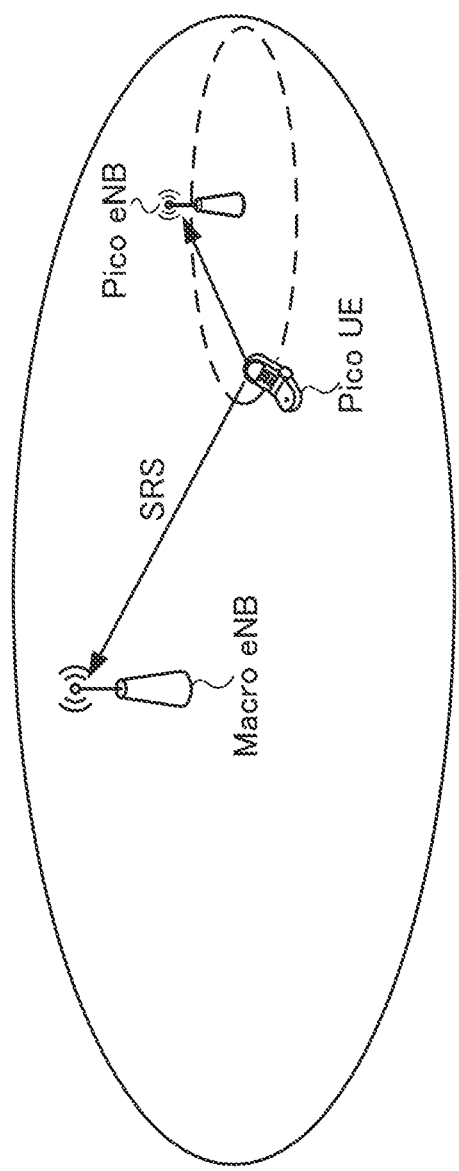
FIG. 2 illustrates SRS transmission.
Figure 3:
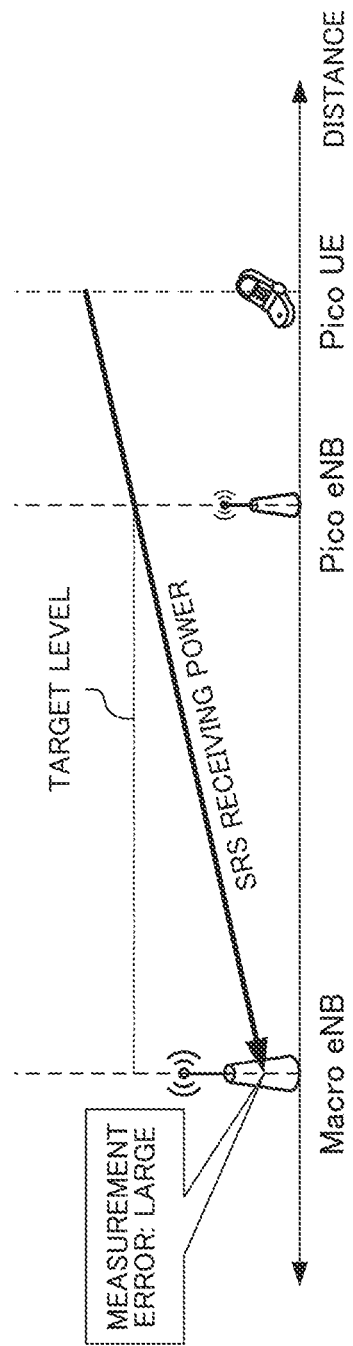
FIG. 3 illustrates a receiving power level of SRS in each base station.

Hereinafter, embodiments of the present disclosure will be described in detail with reference to the drawings. Throughout the embodiments, the same elements are assigned the same reference numerals and any duplicate description of the elements is omitted.

Embodiment 1

[Overview of Communication System]
A communication system according to Embodiment 1 of the present disclosure includes base station 100 representing a macro eNB or pico eNB and terminals 200 representing a pico UE. Base station 100 is an LTE-A compliant base station, and terminals 200 are LTE-A compliant terminals.

Figure 5:
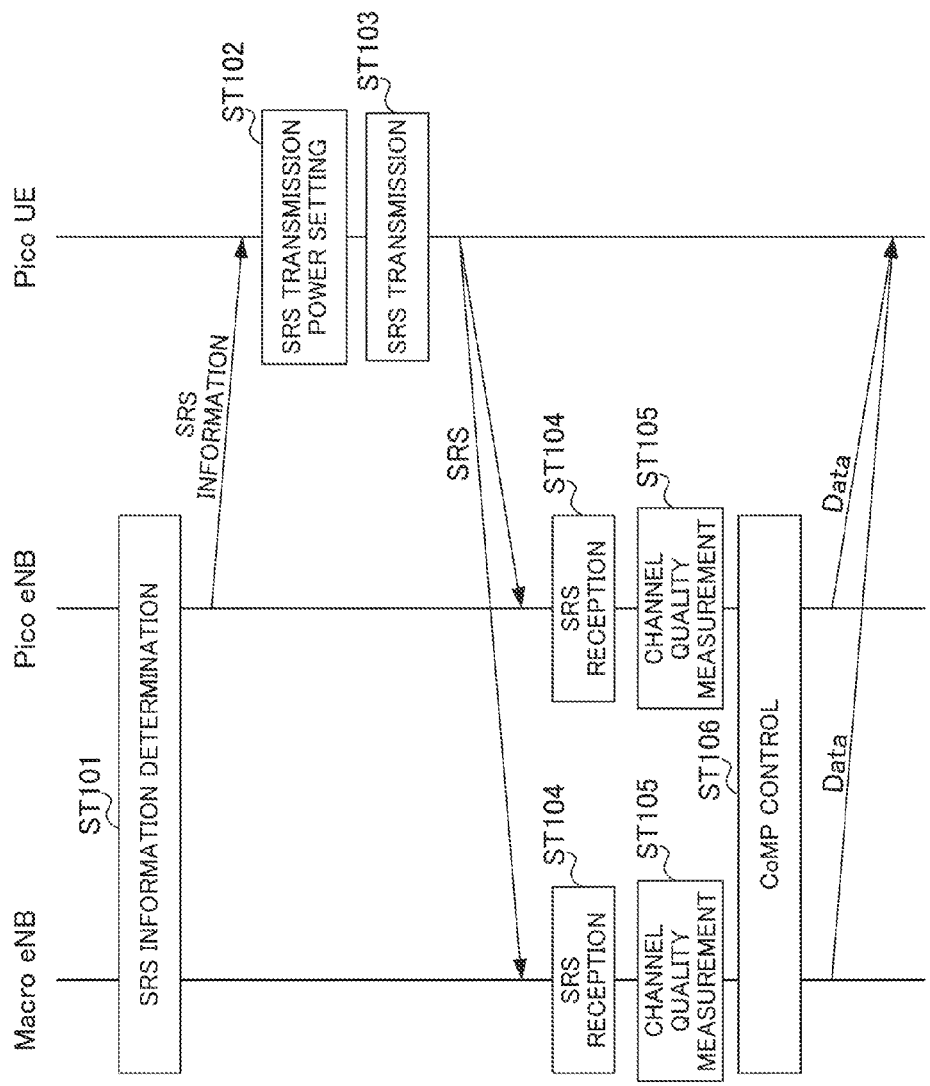
FIG. 5 illustrates a processing flow of a system according to Embodiment 1 of the present disclosure.

FIG. 5 illustrates a processing flow of a system according to Embodiment 1 of the present disclosure. In FIG. 5, a scheduler that performs CoMP control on the macro eNB and the pico eNB determines SRS-related information (SRS information) transmitted from the pico UE (ST101). For example, the SRS information includes subframes in which SRS is power-boosted, and the amount of power boost or the like.

The determined SRS information is shared between the macro eNB and the pico eNB using a cable (communication via an optical fiber) or wirelessly (e.g., communication using an X2 interface). The pico eNB indicates (broadcasts) by radio the SRS information to the pico UE connected to the pico eNB.

The pico UE configures transmission power of SRS according to the SRS information indicated (broadcast) from the pico eNB (ST102), and transmits SRS using a subframe for SRS transmission (e.g., common SRS subframe or individual SRS subframe) (ST103).

The pico eNB and the macro eNB receive SRS transmitted from the pico UE (ST104) and measures channel quality (ST105).

The scheduler that performs CoMP control wiredly or wirelessly collects channel quality measured in the macro eNB and the pico eNB and performs CoMP control (selection of a transmission point, selection of a transmission weight or the like) (ST106). The macro eNB and the pico eNB cooperatively transmit a downlink data signal to the pico UE according to CoMP control.

Figure 6:
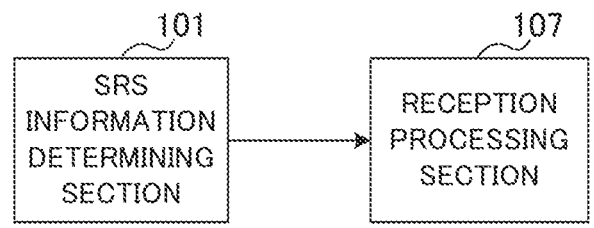
FIG. 6 is a main configuration diagram of a base station according to Embodiment 1 of the present disclosure.

FIG. 6 is a main configuration diagram of base station 100 according to Embodiment 1 of the present disclosure. In base station 100, SRS information determining section 101 determines an offset value (power offset value) corresponding to transmission power of a data signal for terminal 200, and reception processing section 107 receives SRS with the transmission power controlled using the offset value. Here, SRS information determining section 101 determines a first offset value used for SRS transmission when an SRS transmission subframe is a predetermined subframe and a second offset value used for SRS transmission when the SRS transmission subframe is a subframe other than the predetermined subframe.

Figure 7:
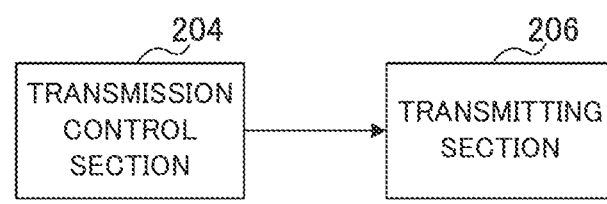
FIG. 7 is a main configuration diagram of a terminal according to Embodiment 1 of the present disclosure.

FIG. 7 is a main configuration diagram of terminal 200 according to Embodiment 1 of the present disclosure. In terminal 200, transmission control section 204 controls transmission power of SRS using an offset value corresponding to transmission power of a data signal and transmitting section 206 transmits SRS with the transmission power controlled in transmission control section 204. Here, transmission control section 204 controls transmission power of SRS using the first offset value when the SRS transmission subframe is the predetermined subframe and controls transmission power of SRS using the second offset value when the transmission subframe is a subframe other than the predetermined subframe.

However, the above second offset value is the offset value set for transmission to the serving cell of terminal 200 and the above first offset value is greater than the second offset value.

[Configuration of Base Station 100]

Figure 8:
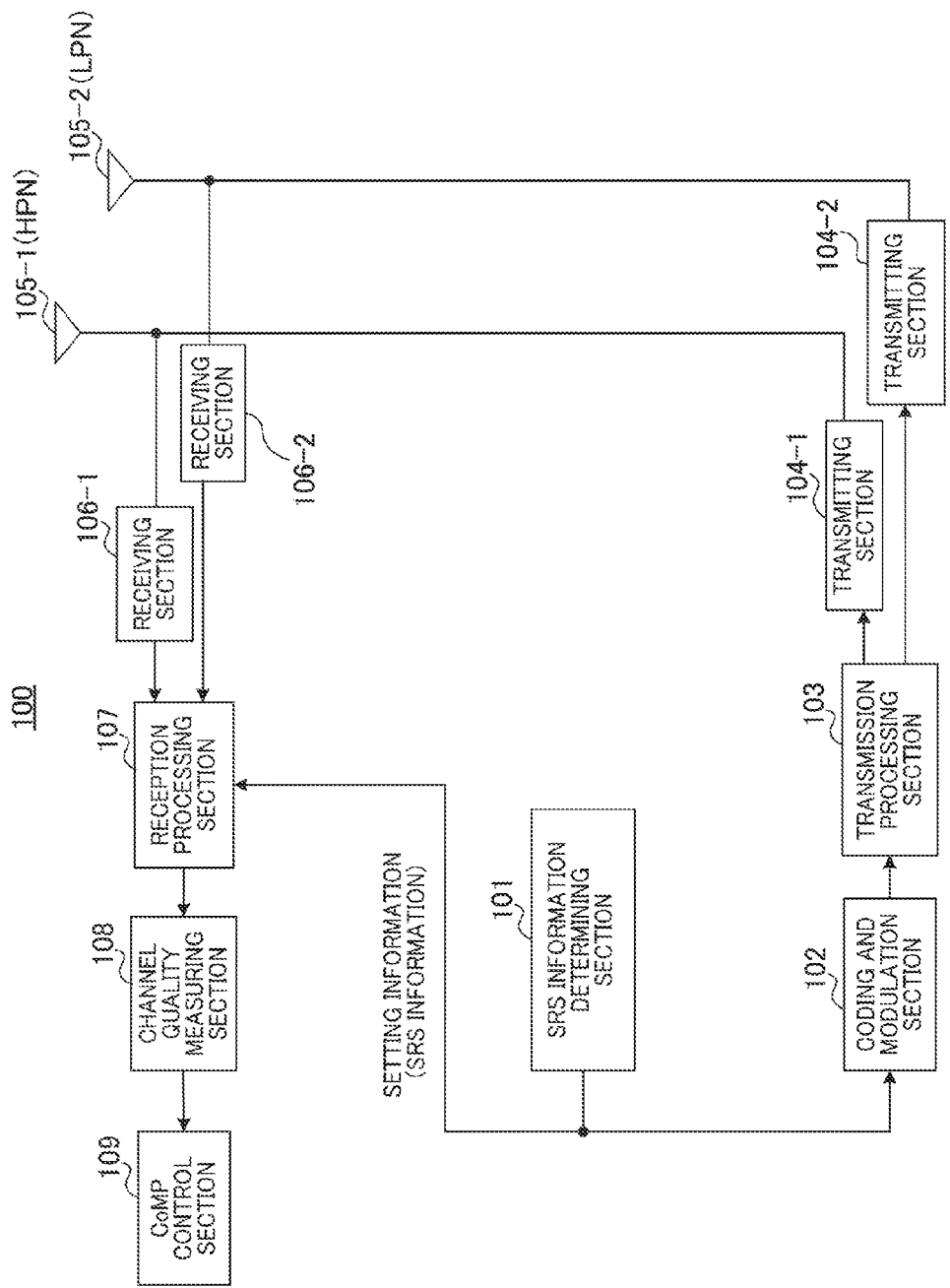
FIG. 8 is a block diagram illustrating a configuration of the base station according to Embodiment 1 of the present disclosure.

FIG. 8 is a block diagram illustrating a configuration of base station 100 according to the present embodiment. In FIG. 8, base station 100 includes SRS information determining section 101, coding and modulation section 102, transmission processing section 103, transmitting sections 104-1 and 104-2, antennas 105-1 and 105-2, receiving sections 106-1 and 106-2, reception processing section 107, channel quality measuring section 108, and CoMP control section 109.

In FIG. 8, regarding a plurality of transmitting/receiving sections and antennas, for example, such an operation is also possible that transmitting section 104-1, receiving section 106-1 and antenna 105-1 are used to form a macro cell (HPN: high power node) and transmitting section 104-2, receiving section 106-2 and antenna 105-2 are used to form a pico cell (LPN: low power node). That is, the respective pairs of components of transmitting section 104, antenna 105 and receiving section 106 are arranged at separate positions to form the macro cell and pico cell respectively and thereby form a heterogeneous network environment.

SRS information determining section 101 determines SRS-related information (SRS information) for target terminal 200. The SRS information contains, in addition to parameters such as common SRS subframes, individual SRS subframes, frequency band (transmission band), bandwidth (or the number of RBs), cyclic shift, transmission comb, the number of antennas, transmission count, frequency-hopping pattern and SRS sequence number, subframes in which SRS is power-boosted and transmitted (hereinafter, referred to as "boost subframes") and the amount of power boost in the boost subframes. To be more specific, SRS information determining section 101 determines a boost subframe and a non-boost subframe in which SRS is transmitted without power boost (hereinafter, referred to as "normal subframe") for each subframe for SRS transmission. Furthermore, SRS information determining section 101 determines a power offset value of SRS used in each subframe (that is, offset value corresponding to transmission power of a data signal (PUSCH)). For example, in a normal subframe, $P_{SRS\_OFFSET,c}(0)$ or $P_{SRS\_OFFSET,c}(1)$ used as conventional P-SRS or A-SRS is used (that is, m=0, 1 shown in equation 1). On the other hand, in a boost subframe, $P_{SRS\_OFFSET,c}(2)$ defined in distinction from a conventional power offset value is used (e.g., m=2 is assumed in equation 1). SRS information determining section 101 then outputs setting information including the determined SRS information to coding and modulation section 102. Details of the method for setting $P_{SRS\_OFFSET,c}(2)$ will be described later.

As described above, the SRS information generated by SRS information determining section 101 is subjected to transmission processing in coding and modulation section 102, transmission processing section 103 and transmitting section 104 as control information of an RRC layer, and then transmitted to target terminal 200.

Furthermore, SRS information determining section 101 transmits setting information including SRS information to target terminal 200 via coding and modulation section 102 and outputs the setting information to reception processing section 107.

Coding and modulation section 102 performs coding and modulation on the SRS information received from SRS information determining section 101 and outputs the modulated signals to transmission processing section 103.

Transmission processing section 103 maps the modulated signals received from coding and modulation section 102 to downlink radio resources to thereby form a transmission signal. Here, when the transmission signal is an OFDM signal, transmission processing section 103 maps the modulated signals to predetermined downlink radio resources, applies inverse fast Fourier transform (IFFT) processing, transforms the modulated signals into time waveform, and adds a CP (cyclic prefix) to thereby form an OFDM signal.

When target terminal 200 is a macro UE (terminal controlled by the macro eNB), the transmission signal is outputted to transmitting section 104-1 (corresponding to a macro cell (HPN)) and when target terminal 200 is a pico UE (terminal controlled by the pico eNB), the transmission signal is outputted to transmitting section 104-2 (corresponding to a pico cell (LPN)).

Transmitting section 104-1 or 104-2 applies transmission radio processing (up-conversion, digital/analog (D/A) conversion or the like) to the transmission signal received from transmission processing section 103 and transmits the transmission signal via antenna 105-1 or 105-2.

Receiving sections 106-1 and 106-2 apply reception radio processing (down-conversion, analog/digital (A/D) conversion or the like) to the radio signal received via antenna 105-1 or 105-2 and outputs the received signal to reception processing section 107. A signal received via antenna 105-1 and receiving section 106-1 is a received signal of the macro eNB and a signal received via antenna 105-2 and receiving section 106-2 is a received signal of the pico eNB.

Reception processing section 107 extracts SRS received in the macro eNB and SRS received in the pico eNB based on SRS information received from SRS information determining section 101 and outputs the SRSs to channel quality measuring section 108.

Channel quality measuring section 108 measures channel quality based on the SRS received from reception processing section 107 (SRS received in the macro eNB and SRS received in the pico eNB). For example, channel quality measuring section 108 calculates a correlation of each reception SRS with a replica signal, and thereby calculates an SINR measured value (or channel response) at a macro eNB reception point and an SINR measured value (or channel response) at a pico eNB reception point. Channel quality measuring section 108 outputs the channel quality obtained to CoMP control section 109.

CoMP control section 109 selects a transmission point of a downlink data signal intended for target terminal 200 based on channel quality (e.g., SINR measured value) at the macro eNB reception point and channel quality (SINR measured value) at the pico eNB reception point. For example, CoMP control section 109 may judge that the performance improvement effect by CoMP transmission will be high when using a reception point (cell) at which the SINR measured value falls within a predetermined threshold compared to a maximum SINR measured value among the SINR measured values received from channel quality measuring section 108. CoMP control section 109 selects one or a plurality of reception points as transmission points of a downlink data signal from among reception points at which the SINR measured value falls within a predetermined threshold. Alternatively, in a TDD system, CoMP control section 109 may also select a transmission weight of downlink data whose quality is highest among reception points of the downlink signal in target terminal 200 based on a channel response at a macro eNB reception point and a channel response at a pico eNB reception point. Such CoMP control is intended to improve system performance.

In the present embodiment, a configuration in which single base station 100 forms a macro cell and a pico cell has been described. However, without being limited to this, a configuration may also be adopted in which a plurality of base stations 100 respectively form macro and pico cells, and appropriately share signals to thereby cause them to operate in a coordinated manner.

[Configuration of Terminal 200]

Figure 9:
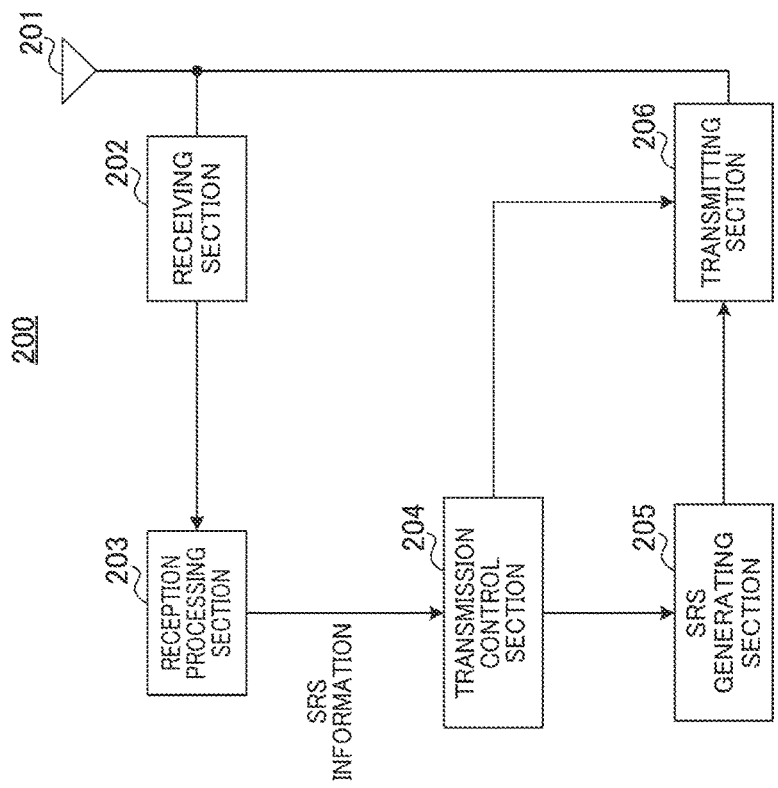
FIG. 9 is a block diagram illustrating a configuration of the terminal according to Embodiment 1 of the present disclosure.

FIG. 9 is a block diagram illustrating a configuration of terminal 200 according to Embodiment 1 of the present disclosure.

In FIG. 9, terminal 200 includes antenna 201, receiving section 202, reception processing section 203, transmission control section 204, SRS generating section 205, and transmitting section 206.

Receiving section 202 applies reception radio processing (down-conversion, analog/digital (A/D) conversion or the like) to a radio signal received via antenna 201 and outputs the received signal obtained to reception processing section 203.

Reception processing section 203 extracts SRS information included in the received signal and outputs the SRS information to transmission control section 204.

Transmission control section 204 outputs transmission resource information included in the SRS information (e.g., information on an SRS transmission subframe, frequency band (transmission band), SRS sequence number or the like) to SRS generating section 205. Transmission control section 204 controls transmission power of SRS based on a power offset value of SRS corresponding to the SRS transmission subframe included in the SRS information. Transmission control section 204 outputs information indicating the controlled transmission power of SRS to transmitting section 206.

SRS generating section 205 generates an SRS using a predetermined SRS sequence number (ZC sequence number, CS number) according to information received from transmission control section 204, maps the SRS to a predetermined radio resource, applies IFFT processing and adds a CP. SRS generating section 205 outputs the signal with the CP to transmitting section 206.

Transmitting section 206 applies transmission radio processing (up-conversion, digital/analog (D/A) conversion or the like) to the transmission signal generated in SRS generating section 205. Transmitting section 206 sets transmission power corresponding to an SRS transmission subframe according to an instruction from transmission control section 204 and transmits the SRS transmission subframe via antenna 201. To be more specific, in a normal subframe, SRS is transmitted with transmission power set using $P_{SRS\_OFFSET,c}(0)$ or $P_{SRS\_OFFSET,c}(1)$ used for conventional P-SRS or A-SRS. Meanwhile, in a boost subframe, SRS is transmitted with transmission power set using $P_{SRS\_OFFSET,c}(2)$ defined in distinction from conventional power offset values. Details of the method for setting $P_{SRS\_OFFSET,c}(2)$ will be described later.

[Operations of Base Station 100 and Terminal 200]

A description will be provided regarding operations of base station 100 and terminal 200 respectively including the abovementioned configurations.

[Operation of Base Station 100]

In base station 100, SRS information determining section 101 determines SRS information for target terminal 200. To be more specific, SRS information determining section 101 sets, in addition to power offset value $P_{SRS\_OFFSET,c}(0)$ or $P_{SRS\_OFFSET,c}(1)$ of SRS used in normal subframes, power offset value $P_{SRS\_OFFSET,c}(2)$ of SRS used in boost subframes.

A value greater than $P_{SRS\_OFFSET,c}(0)$ and $P_{SRS\_OFFSET,c}(1)$ can be set as the value of $P_{SRS\_OFFSET,c}(2)$. For example, the amount of power boost equivalent to the difference between the pico UE-pico eNB path loss and the pico UE-macro eNB path loss may be set as the value of $P_{SRS\_OFFSET,c}(2)$. That is, the values of $P_{SRS\_OFFSET,c}(0)$ and $P_{SRS\_OFFSET,c}(1)$ for the pico UE are values set by taking into account the path loss between the pico UE and the pico eNB (serving cell of the pico UE), whereas the value of $P_{SRS\_OFFSET,c}(2)$ for the pico UE is a value set by taking into account the path loss between the pico UE and the macro eNB. In other words, the values of $P_{SRS\_OFFSET,c}(0)$ and $P_{SRS\_OFFSET,c}(1)$ for the pico UE are power offset values set to be transmitted to the pico eNB (serving cell of the pico UE), whereas the value of $P_{SRS\_OFFSET,c}(2)$ for the pico UE is a power offset value set to be transmitted to the macro eNB.

Reception processing section 107 of base station 100 receives SRS with transmission power controlled using the above power offset value in terminal 200.

Thus, the pico UE (terminal 200) uses $P_{SRS\_OFFSET,c}(2)$ in boost frames, and can thereby transmit SRS with transmission power compensating for the path loss between the pico UE and the macro eNB. Therefore, the macro eNB can receive SRS from the pico UE at a signal level sufficiently greater than a noise level and accurately measure channel quality.

[Operation of Terminal 200]

On the other hand, in terminal 200, transmission control section 204 controls transmission power of SRS in accordance with the SRS transmission subframe based on the SRS information indicated from base station 100. Transmission control section 204 calculates transmission power of SRS according to equation 1. To be more specific, in normal subframes, transmission control section 204 calculates transmission power of SRS according to equation 1 using power offset value $P_{SRS\_OFFSET,c}(0)$ or $P_{SRS\_OFFSET,c}(1)$ (that is, m=0 or 1). On the other hand, in boost subframes, transmission control section 204 calculates transmission power of SRS according to equation 1 using power offset value $P_{SRS\_OFFSET,c}(2)$ (that is, m=2).

Figure 10:
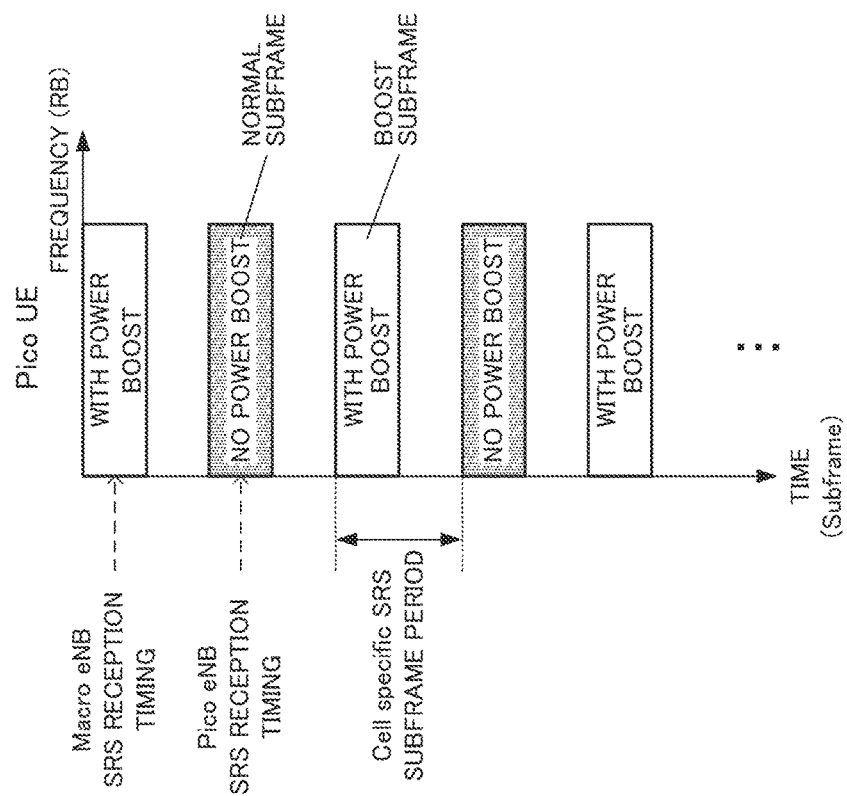
FIG. 10 illustrates SRS transmission subframes according to Embodiment 1 of the present disclosure.

For example, as shown in FIG. 10, let us suppose that a predetermined subframe (SRS reception timing of the macro eNB in FIG. 10) is set as a boost subframe in a cell specific SRS subframe, and a subframe other than the predetermined subframe (SRS reception timing of the pico eNB in FIG. 10) is set as a normal subframe. That is, the power offset value of a boost subframe is greater than the power offset value of a normal subframe.

In this case, as shown in FIG. 10, boost amount Δ=0 dB in a normal subframe, and the pico UE (terminal 200) transmits SRS with transmission power using the conventional power offset value ($P_{SRS\_OFFSET,c}(0)$ or $P_{SRS\_OFFSET,c}(1)$) (that is, transmission power set for the pico eNB). On the other hand, as shown in FIG. 10, boost amount Δ=10 dB in a boost subframe, and the pico UE (terminal 200) transmits an SRS with power-boosted transmission power (that is, transmission power set for the macro eNB).

Figure 11:
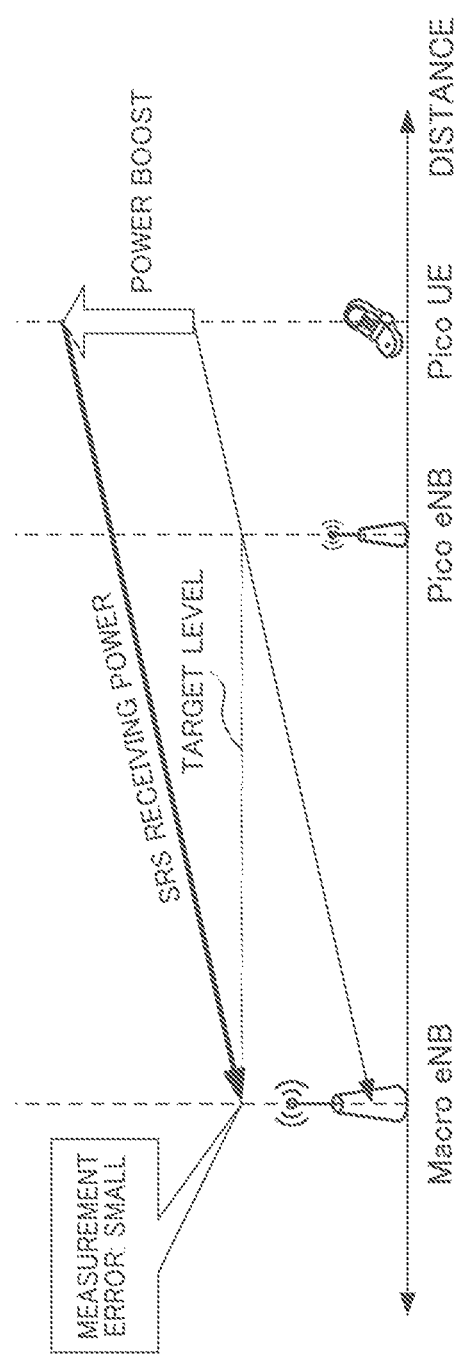
FIG. 11 illustrates a receiving power level of SRS in each base station according to Embodiment 1 of the present disclosure.

Thus, as shown in FIG. 11, in a boost subframe, the pico UE transmits an SRS with transmission power power-boosted by boost amount Δ compared to transmission power in a normal subframe (transmission power with which the pico eNB can receive SRS at a target level). In this way, the pico UE power-boosts transmission power of SRS transmitted in a predetermined subframe (boost subframe), so that the macro eNB can receive the SRS transmitted from the pico UE at a target level (signal level with little influence of noise) or higher. Therefore, the macro eNB can reduce a channel quality (e.g., SINR) measurement error. Thus, since the macro eNB can accurately measure channel quality between the pico UE and the macro eNB, it is possible to appropriately select a transmission point or transmission weight and thus to improve the effect of improving system performance by CoMP.

As shown in FIG. 10, the pico UE (terminal 200) limits subframes to be power-boosted for SRS to only predetermined subframes (boost subframes). This makes it possible to limit increases in power consumption of terminal 200. Moreover, when subframes to be power-boosted are limited, subframes in which other cell interference increases are also limited. Thus, it is possible to limit increases in consumption of SRS transmission resources (time, frequency, codes) of the entire system and thus to reduce overhead of the system.

Figure 12:
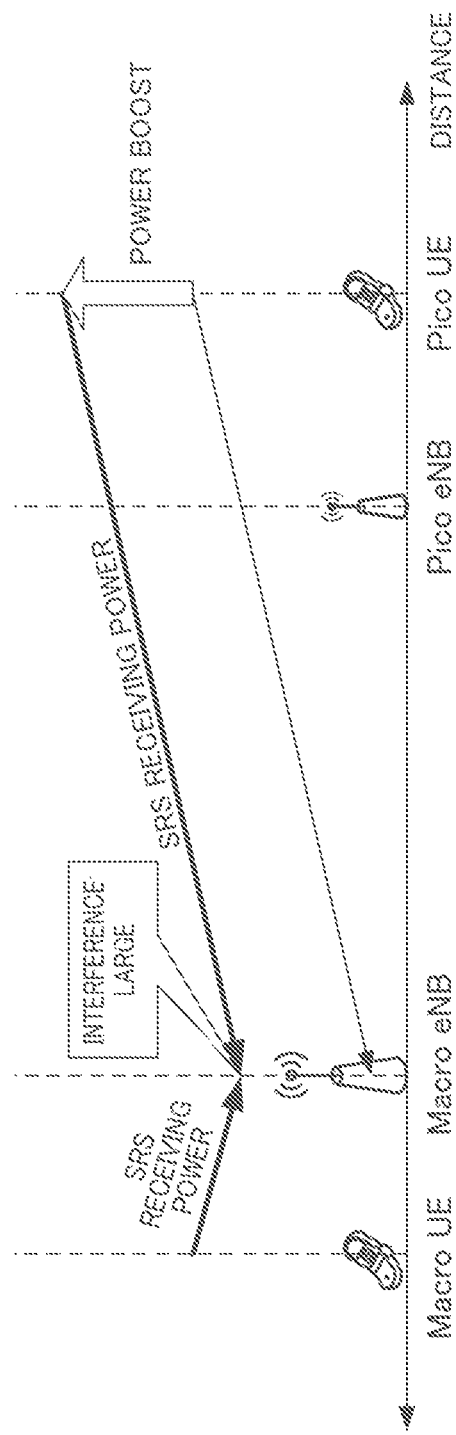
FIG. 12 illustrates an effect of other cell interference in a macro eNB according to Embodiment 1 of the present disclosure.

More specifically, if the terminal always applies power boost to transmit SRS, the influence of other cell interference (interference provided from the pico cell to the macro cell in FIG. 12) increases as shown in FIG. 12. In this case, it is necessary to divide (orthogonalize) transmission resources for SRS transmitted between the terminal (pico UE) and the terminal of the other cell (macro UE in FIG. 12), and SRS transmission resources required in the entire system (overhead of the system) increase and the system performance deteriorates. On the other hand, other cell interference is small in not power-boosted subframes as in the conventional case, and therefore, for example, the same SRS transmission resources can be used for SRS of terminals respectively connected to pico cells located at great distances and overhead of the system can be reduced.

On the other hand, in the present embodiment, terminal 200 applies power boost only in predetermined subframes (boost subframes) and does not apply power boost in other subframes (normal subframes) as shown in FIG. 10. Compared to FIG. 12, this can reduce subframes in which other cell interference increases, limit increases in consumption of SRS transmission resources (time, frequency, codes) of the entire system and prevent overhead of the system from increasing.

The greater the limitation to subframes to be power-boosted, the longer the period during which channel quality between the pico UE and the macro eNB cannot be measured becomes and control over switching between transmission points in CoMP control can be no longer performed dynamically. On the other hand, the more dynamically switching between transmission points in CoMP control is controlled, the greater the time variation of interference becomes, and the more MCS selection errors may occur, causing performance to deteriorate. For this reason, even when moderate CoMP control is applied by limiting subframes to be power-boosted as in the case of the present embodiment, the performance improvement effect by CoMP is never drastically reduced.

When transmission power of SRS in terminal 200 is calculated, parameters other than $P_{SRS\_OFFSET,c}(m)$ shown in equation 1 are not dependent on SRS transmission subframes (normal subframes and boost subframes) and values previously indicated from base station 100 are used. That is, even for the path loss ($PL_c$) shown in equation 1, values not dependent on SRS transmission subframes and measured with reference to the serving cell of terminal 200 are used. That is, terminal 200 changes the value of $P_{SRS\_OFFSET,c}(m)$ shown in equation 1 in accordance with the SRS transmission subframe, but does not change parameters other than $P_{SRS\_OFFSET,c}(m)$ shown in equation 1. This makes it possible to limit increases in the amount of signaling from base station 100 to terminal 200 compared to a case where all parameters of equation 1 are changed between boost subframes and normal subframes. However, even when all parameters in equation 1 are changed between boost subframes and normal subframes, it is possible to improve the effect of improving system performance by CoMP as in the case of the present embodiment. In this case, since the pico UE measures a path loss of the macro eNB which is not the serving cell (pico eNB), it is necessary to know the transmission power value (referenceSignalPower shown in equation 2) of the reference signal in the macro eNB.

Thus, SRS information determining section 101 in base station 100 determines a power offset value corresponding to transmission power of a data signal for terminal 200. In this case, SRS information determining section 101 determines a first power offset value used for SRS transmission when the SRS transmission subframe is a boost subframe, and a second offset value used for SRS transmission when the SRS transmission subframe is a normal subframe.

In terminal 200, transmission control section 204 controls transmission power of SRS using a power offset value corresponding to transmission power of a data signal. In this case, transmission control section 204 controls transmission power of SRS using the first offset value when the SRS transmission subframe is a boost subframe and controls transmission power of SRS using the second offset value when the SRS transmission subframe is a normal subframe. Transmitting section 206 transmits SRS with the controlled transmission power.

However, the above second offset value (that is, ($P_{SRS\_OFFSET,c}(0)$ or $P_{SRS\_OFFSET,c}(1)$) is a power offset value set to be transmitted to the serving cell of terminal 200, and the first offset value ($P_{SRS\_OFFSET,c}(2)$) is greater than the second offset value.

It is thereby possible to limit increases in power consumption in the terminal and increases in other cell interference.

SRS information determining section 101 may also use a value common to P-SRS and A-SRS as the power offset value of SRS used in a boost subframe. That is, SRS information determining section 101 may set one value of aforementioned $P_{SRS\_OFFSET,c}(2)$ (value greater than the conventional power offset value) between P-SRS and A-SRS. This makes it possible to prevent deterioration of receiving quality of SRS while limiting increases in the amount of signaling for indicating the power offset value of SRS.

Furthermore, a distinction may be made in the power offset value of SRS used in a boost subframe between P-SRS and A-SRS. For example, SRS information determining section 101 may set $P_{SRS\_OFFSET,c}(2)$ for P-SRS transmission in a boost subframe and set $P_{SRS\_OFFSET,c}(3)$ for A-SRS transmission in a boost subframe. Here, SRS information determining section 101 sets a value greater than $P_{SRS\_OFFSET,c}(0)$ (conventional offset value for P-SRS (Type0 SRS)) as the value of $P_{SRS\_OFFSET,c}(2)$. Similarly, SRS information determining section 101 sets a value greater than $P_{SRS\_OFFSET,c}(0)$ (conventional offset value for A-SRS (Type1 SRS)) as the value of $P_{SRS\_OFFSET,c}(3)$. Even when target quality is different between P-SRS and A-SRS, this allows the minimum necessary power boost amount for preventing deterioration in receiving quality of SRS in base station 100 to be individually set. Thus, since terminal 200 sets minimum necessary transmission power in accordance with each SRS, it is possible to limit increases in power consumption and other cell interference in terminal 200.

SRS information determining section 101 may set a boost amount Δ corresponding to the conventional power offset value instead of setting the power offset value used in boost subframes. That is, terminal 200 uses "$P_{SRS\_OFFSET,c}(0)+\Delta$" as the power offset value during P-SRS transmission in boost subframes and uses "$P_{SRS\_OFFSET,c}(1)+\Delta$" as the power offset value during A-SRS transmission in boost subframes. That is, only a difference (boost amount Δ) from the conventional power offset value is indicated as the power offset of boost subframes, and it is thereby possible to further reduce the amount of signaling of the power offset value in boost subframes compared to the amount of signaling of the conventional power offset value. By so doing, it is possible to reduce the amount of signaling, and individually set the minimum necessary power boost amount to prevent deterioration of SRS receiving quality in base station 100 even when target quality differs between P-SRS and A-SRS.

Embodiment 2

In the present embodiment, the method for setting a power offset value in a boost subframe described in Embodiment 1 will be described in detail.

Hereinafter, methods for setting power offset values 1 to 3 in a boost subframe will be described, respectively.

[Setting Method 1]

Setting method 1 is a method for setting an upper limit value capable of being set as a power offset value ($P_{SRS\_OFFSET,c}(2)$) of SRS used in a boost subframe to be a value greater than a power offset value ($P_{SRS\_OFFSET,c}(0)$ or $P_{SRS\_OFFSET,c}(1)$) used in a normal subframe.

As an example of the power offset value used in a normal subframe, $P_{SRS\_OFFSET,c}(0)$ is expressed in a step width of 1.5 [dB] within an range of −10.5 to 12.0 [dB]. That is, $P_{SRS\_OFFSET,c}(0)$ is expressed in 15 steps and is indicated using 4 bits from base station 100 to terminal 200.

In contrast, the step width of power offset value $P_{SRS\_OFFSET,c}(2)$ used in a boost subframe may be set to be equal to the step width of $P_{SRS\_OFFSET,c}(0)$ and the setting range of $P_{SRS\_OFFSET,c}(2)$ may be set to a value obtained by adding an offset to the setting range of $P_{SRS\_OFFSET,c}(0)$.

For example, the setting range of power offset value $P_{SRS\_OFFSET,c}(2)$ may be set to −5.5 to 17.0 [dB] by adding 5 dB to the setting range (−10.5 to 12.0 [dB]) of $P_{SRS\_OFFSET,c}(0)$. That is, power offset value $P_{SRS\_OFFSET,c}(2)$ is expressed in a step width of 1.5 [dB] within a range of −5.5 to 17.0 [dB]. That is, $P_{SRS\_OFFSET,c}(2)$ is expressed in 15 steps in the same as $P_{SRS\_OFFSET,c}(0)$ and indicated using 4 bits from base station 100 to terminal 200.

This allows terminal 200 to set transmission power of SRS within a setting range having a greater upper limit value in boost subframes than in normal subframes and with setting accuracy (step width) similar to that of normal subframes.

Alternatively, the step width of power offset value $P_{SRS\_OFFSET,c}(2)$ used in boost subframes may be greater than the step width of $P_{SRS\_OFFSET,c}(0)$ as another setting method.

For example, the step width of power offset value $P_{SRS\_OFFSET,c}(2)$ may be set to 2.5 [dB] which is greater by 1.0 [dB] than the step width of $P_{SRS\_OFFSET,c}(0)$ (1.5 [dB]). That is, when the minimum value of the power offset value is assumed to be the same value (−10.5 [dB]) as that of $P_{SRS\_OFFSET,c}(0)$, the setting range of power offset value $P_{SRS\_OFFSET,c}(2)$ is −10.5 to 27.0 [dB]. That is, power offset value $P_{SRS\_OFFSET,c}(2)$ is expressed in a step width of 2.5 [dB] within a range of −10.5 to 27.0 [dB]. In this case, $P_{SRS\_OFFSET,c}(2)$ is also expressed in 15 steps as in the case of $P_{SRS\_OFFSET,c}(0)$ and indicated using 4 bits from base station 100 to terminal 200.

This allows terminal 200 to set transmission power of SRS within a setting range having a greater upper limit value in boost subframes than in normal subframes and in a wider range including the setting range of normal subframes.

This enables terminal 200 to perform power boost compensating for a path loss difference between the macro eNB and the pico eNB, enables the macro eNB to receive SRS from the pico UE with appropriate receiving power (target level) and reduce measurement errors in channel quality.

Flag information indicating whether or not to change the upper limit value of power offset value $P_{SRS\_OFFSET,c}(2)$ in boost subframes from the power offset value ($P_{SRS\_OFFSET,c}(0)$ or $P_{SRS\_OFFSET,c}(1)$) in normal subframes may be indicated previously from the pico eNB to the pico UE. For example, when the distance between the macro eNB and the pico UE is equal to or greater than a previously set threshold (when the path loss is large), a greater power boost amount is necessary for SRS, and therefore the setting range (upper limit value) of $P_{SRS\_OFFSET,c}(2)$ may be changed to the aforementioned setting. On the other hand, when the distance between the macro eNB and the pico UE is smaller than the previously set threshold (when the path loss is small), a greater power boost amount is unnecessary for SRS, and therefore a setting range similar to that of $P_{SRS\_OFFSET,c}(0)$ or $P_{SRS\_OFFSET,c}(1)$ may be used without changing the setting range (upper limit value) of $P_{SRS\_OFFSET,c}(2)$.

[Setting Method 2]

Setting method 2 is a method that sets a boost amount Δ for a conventional power offset value ($P_{SRS\_OFFSET,c}(0)$ or $P_{SRS\_OFFSET,c}(1)$) of $P_{SRS\_OFFSET,c}(2)$. That is, the power offset value $P_{SRS\_OFFSET,c}(2)$ used in boost subframes is a value obtained by increasing the power offset ($P_{SRS\_OFFSET,c}(0)$ or $P_{SRS\_OFFSET,c}(1)$) used in normal subframes by a predetermined value.

Base station 100 indicates (broadcasts) only the boost amount Δ to terminal 200. Terminal 200 then calculates power offset value $P_{SRS\_OFFSET,c}(2)$ in boost subframes according to equation 3 using the boost amount Δ indicated from base station 100. Equation 3 shows a case where the boost amount Δ is added to power offset value $P_{SRS\_OFFSET,c}(0)$ of P-SRS, but the boost amount Δ may likewise be added to power offset value $P_{SRS\_OFFSET,c}(1)$ of A-SRS to calculate power offset value $P_{SRS\_OFFSET,c}(2)$ in boost subframes.

[3]

$$P_{SRS\_OFFSET,c}(2)=P_{SRS\_OFFSET,c}(0)+\Delta \quad \text{(Equation 3)}$$

The number of bits for indicating the boost amount Δ is smaller than the number of bits for indicating (4 bits) the conventional power offset value ($P_{SRS\_OFFSET,c}(0)$ or $P_{SRS\_OFFSET,c}(1)$). For example, when the boost amount Δ is expressed in four types 0, 5, 10, 15 dB in a step width of 5 [dB], the number of bits for indicating the boost amount Δ is 2. That is, base station 100 indicates (broadcasts) information of 2 bits on the power offset value of a boost subframe.

Figure 4:
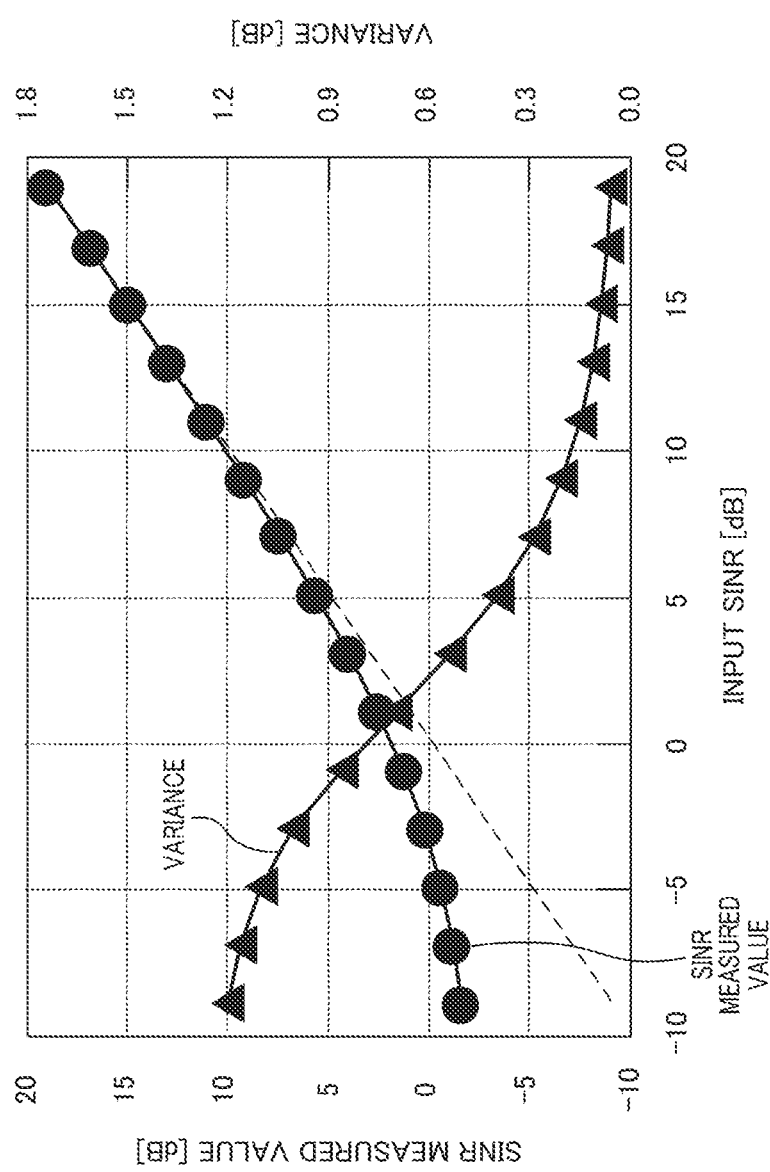
FIG. 4 illustrates SINR measured values and variance characteristics with respect to an input SINR.

Here, as shown in FIG. 4, if the macro eNB can receive SRS in a region of input SINR where there is little influence of noise (region where SINR is equal to or greater than a target SINR level (e.g., 5 dB)), high channel quality measurement accuracy can be secured. Thus, when the number of bits for indicating the boost amount Δ is set to be smaller than the number of bits for indicating conventional power offset value ($P_{SRS\_OFFSET,c}(0)$ or $P_{SRS\_OFFSET,c}(1)$), although values of the boost amounts that can be set by terminal 200 become rough, it is possible for terminal 200 to set transmission power of SRS so that base station 100 obtains SINR equal to or higher than the target SINR level. This allows base station 100 to perform appropriate CoMP control (selection of transmission point, selection of transmission weight or the like) and thereby improve the effect of improving system performance by applying CoMP.

Thus, the boost amount Δ corresponding to the conventional power offset value of $P_{SRS\_OFFSET,c}(2)$ is set to the number of bits smaller than that of the conventional power offset value. This makes it possible to indicate (broadcast) an SRS power offset value for boost subframes with a smaller amount of signaling while maintaining the effect of improving system performance by applying CoMP.

[Setting Method 3]

Setting method 3 is a method that sets cell-specific boost amount Δ in operation in which a pico eNB is located in the coverage area of a macro eNB (macro cell).

To be more specific, as shown in FIG. 1, when one or a plurality of pico eNBs are located in the coverage area of a macro eNB, a pico UE connected to each pico eNB can receive a downlink signal from the macro eNB. In order for base station 100 to perform optimum CoMP control, it is necessary to receive SRSs of all pico UEs connected to the pico eNBs within the coverage area of the macro eNB and accurately measure channel quality.

According to setting method 3, base station 100 sets one boost amount Δ used in boost subframes for the pico UE and indicates the boost amount Δ to all pico UEs (terminals 200) connected to the pico eNBs within the coverage area of the macro eNB. The boost amount Δ set for the pico UE is, for example, a maximum value of the necessary boost amount of each pico UE. That is, in a system that performs CoMP transmission (coordinated transmission) among a plurality of base stations (cells) including a macro eNB and one or more pico eNBs arranged within the coverage area of the macro eNB, the boost amount Δ is a common value among terminals 200 (pico UEs) connected to one or more pico eNBs.

Thus, the boost amount Δ corresponding to the conventional power offset value of $P_{SRS\_OFFSET,c}(2)$ is set to the number of bits which is smaller than that of the conventional power offset value. It is thereby possible to indicate (broadcast) an SRS power offset value for boost subframes with a small amount of signaling while maintaining the effect of improving the system performance by applying CoMP.

Furthermore, in an operation whereby pico eNBs are arranged within the coverage area of a macro eNB, setting a cell-specific boost amount Δ makes it possible to further reduce the amount of signaling compared to a case where the boost amount Δ is set for each pico UE while maintaining the effect of improving system performance by applying CoMP.

Methods 1 to 3 for setting a power offset value in boost subframes have been described so far.

As described above, it is possible to limit increases in power consumption of a terminal and also increases in other cell interference without increasing the amount of signaling of control information.

Embodiment 3

In the present embodiment, the method for setting a boost subframe described in Embodiment 1 will be described, more specifically.

Figure 13:
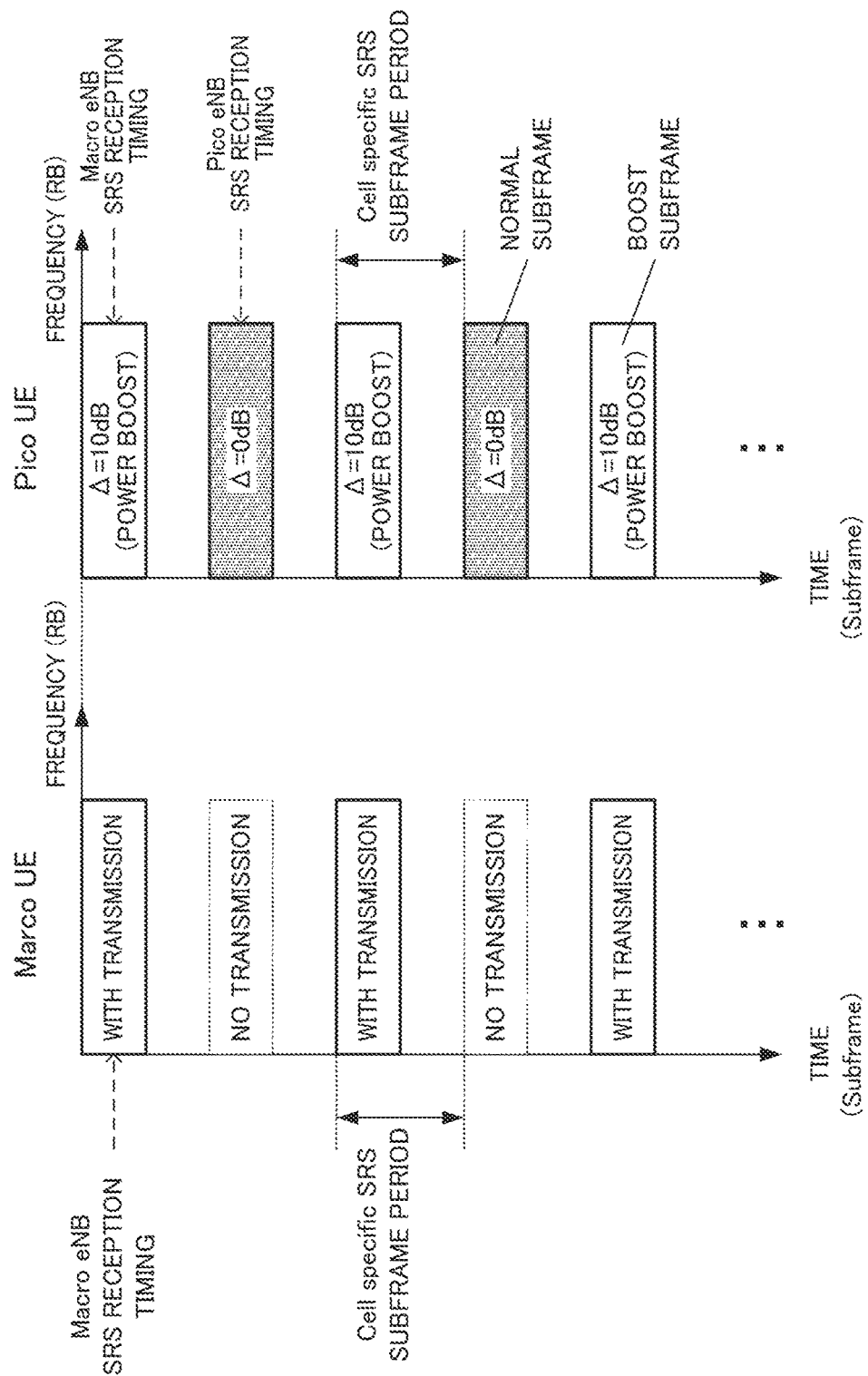
FIG. 13 illustrates a transmission power control method for SRS according to Embodiment 3 of the present disclosure.

Hereinafter, boost subframe setting methods 1 to 3 will be described, individually. As shown in FIG. 13, it is assumed that a value obtained by adding a boost amount Δ to a power offset value of a normal subframe is used as the power offset value of a boost subframe.

[Setting Method 1]

According to setting method 1, as shown in FIG. 13, boost subframes are set as SRS transmission subframes of the macro UE (that is, reception timings of the macro eNB). On the other hand, normal subframes are set to subframes other than SRS transmission subframes of the macro UE. This boost subframe (SRS transmission subframe of the macro UE) is indicated from base station 100 to terminal 200 (pico UE).

Thus, since the pico UE power-boosts SRS only at SRS reception timing of the macro eNB, the number of subframes in which other cell interference increases decreases as in the case of Embodiment 1, which in turn makes it possible to suppress consumption of SRS transmission resources (time, frequency, codes) of the entire system and to prevent overhead of the system from increasing.

The pico UE shown in FIG. 13 represents a pico UE in a group of a plurality of base stations that perform CoMP transmission (macro eNBs and pico eNBs) (which may also be referred to as "CoMP set") in the coverage area of the macro eNB. That is, SRS transmission subframes similar to those in FIG. 13 are set for pico UEs connected to each pico eNB in the above group. In other words, as shown in FIG. 13, cell-specific subframes are set for the pico UE.

That is, as shown in FIG. 13, the pico UE (terminal 200) transmits SRS without power boost (Δ=0 [dB]) in subframes other than SRS transmission subframes of the macro UE (normal subframes). In normal subframes (that is, timings at which the pico UE transmits SRS without power boost), a macro UE that has large transmission power transmits no SRS ("no transmission" shown in FIG. 13). Therefore, no interference from the macro UE to the pico UE occurs in normal subframes.

Thus, according to setting method 1, it is possible to limit increases in power consumption of the terminal and also increases in other cell interference as in the case of Embodiment 1.

In boost subframes, the macro eNB receives SRS from the macro UE with high transmission power and SRS from the power-boosted pico UE. For this reason, in boost subframes, transmission resources may be divided for SRSs transmitted by terminals of each cell to prevent interference between other cells.

[Setting Method 2]

According to setting method 2, boost subframes are set in a bit map format of common SRS subframe units. That is, which SRS transmission subframe is a predetermined subframe (boost subframe) is expressed in a bit map in SRS transmission subframe units. This bit map is indicated from base station 100 to terminal 200.

For example, when a boost subframe is represented by '0' and a normal subframe is represented by '1,' a bit map pattern of a predetermined time length (e.g., data sequence such as '01011000 . . . ') is indicated from base station 100 to terminal 200 in common SRS subframe units set for each cell.

Base station 100 can thereby flexibly set boost subframes of each cell in common SRS subframe units, so that SRS interference control between terminals 200 becomes easier in each cell, which makes it possible to limit increases in SRS transmission resources.

[Setting Method 3]

According to setting method 3, boost subframes are set using a combination of predetermined periods and subframe offsets used to define a common SRS subframe. That is, a predetermined subframe period and subframe offsets indicating the positions of boost subframes in a plurality of subframes corresponding to one period are indicated from base station 100 to terminal 200.

As described above, a common SRS subframe is defined by a combination of a predetermined period and subframe offset in cell units. For example, when the period is 10 subframes and a subframe offset is 3, a third subframe within a period configured in 10-subframe units (e.g., 1 frame) is set as a common SRS subframe.

Similarly, a boost subframe is also defined by a combination of a predetermined period and subframe offset. Terminal 200 may identify as a normal subframe a common SRS subframe other than a boost subframe identified by a predetermined period and subframe offset. For example, when boost subframes are set as subframes #0, #5, #10, . . . , base station 100 may set period=5 subframes and subframe offset=0.

Since a plurality of boost subframes set periodically can be collectively set in this way, the amount of signaling can be reduced compared to a case where boost subframes are indicated for each subframe.

Embodiment 4

The present embodiment is different from Embodiment 1 in that terminal 200 determines whether or not the effect of applying CoMP is large, and applies power boost and transmits SRS only when the effect of applying CoMP is large.

Figure 14:
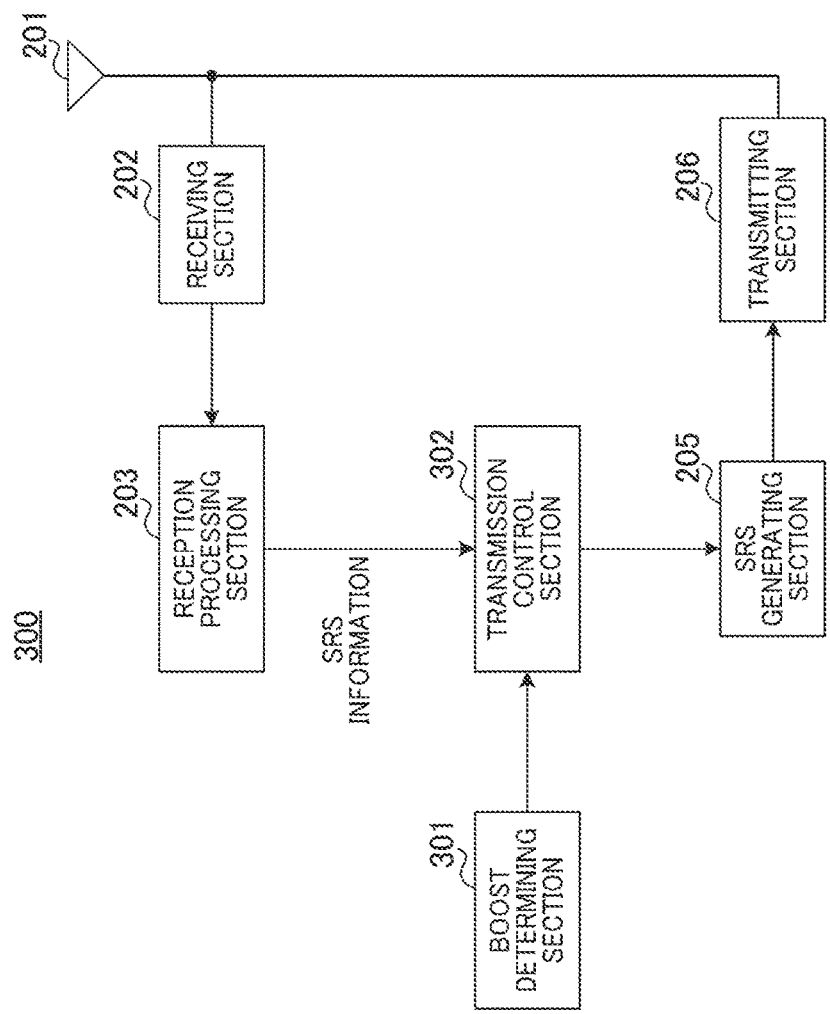
FIG. 14 is a block diagram illustrating a configuration of a terminal according to Embodiment 4 of the present disclosure.

FIG. 14 is a block diagram illustrating a configuration of terminal 300 according to the present embodiment.

In terminal 300, boost determining section 301 determines whether or not to apply power boost to SRS and outputs the determination result (applied: ON, not applied: OFF) to transmission control section 302. For example, boost determining section 301 determines whether or not to apply power boost to SRS based on whether or not the effect of improving the system performance by applying CoMP is large. Details of the determining processing in boost determining section 301 will be described later.

When the output from boost determining section 301 is ON (power boost is applied), transmission control section 302 controls SRS transmission using a power offset value in burst subframes in the same way as transmission control section 204 (FIG. 9) according to Embodiments 1 to 3. On the other hand, when the output from boost determining section 301 is OFF (power boost is not applied), transmission control section 302 does not apply power boost even in burst subframes and controls SRS transmission using a power offset value in normal subframes.

Next, details of the determination processing in boost determining section 301 will be described.

The determination processing in boost determining section 301 as to whether or not power boost for SRS is applied is based on the following viewpoints.

Terminals (pico UEs) having a large effect of improving the system performance by applying CoMP are terminals that have a relatively small distance from both the macro eNB and the pico eNB. In other words, terminals (pico UEs) having a large effect of improving the system performance by applying CoMP are terminals located near both cell edges of the macro eNB and the pico eNB. When CoMP is not applied (transmission from a single cell), receiving quality is poor in this terminal because of the terminal being at the cell edge. Thus, a drastic improvement of the receiving quality is expected by applying CoMP (coordinated transmission from a plurality of cells) to this terminal.

On the other hand, for terminals other than the above-described terminals (terminals located near any one of cell centers of the macro eNB and the pico eNB), receiving quality is originally good even without application of CoMP (transmission from the single cell), so that the effect of improving the system performance by applying CoMP is small.

In this respect, in the present embodiment, terminal 300 applies power boost of SRS to only terminals relatively near both the macro eNB and the pico eNB. That is, boost determining section 301 of terminal 300 determines whether or not to use, in boost subframes, a power offset value greater than a power offset value in normal subframes (whether or not to apply power boost) in accordance with the conditions of terminal 300.

Next, methods 1 and 2 for determining whether or not power boost is applied in boost determining section 301 will be described in detail.

[Determining Method 1]

According to determining method 1, boost determining section 301 determines whether or not terminal 300 is a terminal to which power boost is applied based on an offset amount of CRE (Cell range expansion).

CRE is a technique of expanding an area where the pico cell is selected. In CRE, an offset amount (value set in dB) is added to connection link selection criteria of the pico cell (downlink receiving power or propagation loss). Therefore, when the offset amount is positive, the area in which the terminal is connected to the pico cell expands, whereas when the offset amount is negative, the area in which the terminal is connected to the pico cell shrinks. The offset amount of CRE is obtained using information previously indicated to the terminal (e.g., value of CellsToAddMod;;cellIndividualOffset of MeasObjectEUTRA described in "3 GPP TS36.331").

Thus, boost determining section 301 determines whether or not to apply power boost to SRS based on the offset amount of CRE. That is, when the offset amount of CRE is positive, boost determining section 301 determines that terminal 300 is a terminal to which power boost is applicable and determines that power boost is applied (determination result: ON). On the other hand, when the offset amount of CRE is negative, boost determining section 301 determines that terminal 300 is not a terminal to which power boost is applicable and determines that power boost is not applied (determination result: OFF).

Thus, terminal 300 applies power boost to SRS only in a situation in which the offset amount of CRE is positive and terminal 300 is located at the cell edge of the pico cell, which in turn makes it possible to further reduce power consumption of terminal 300 and subframes in which other cell interference increases, compared to Embodiment 1.

Moreover, boost determining section 301 may also determine whether terminal 300 is located at the cell edge (terminal to which power boost is applicable) or located near the center of the cell using results of a comparison between the level of other cell interference and the signal level of the serving cell thereof in addition to the offset amount of CRE.

To be more specific, when the offset amount of CRE is positive and the ratio of the signal level of the serving cell thereof to the level of other cell interference is equal to or less than a previously set threshold, boost determining section 301 determines that terminal 300 is a terminal to which power boost is applicable (terminal located near the cell edge) and determines that power boost is applied (determination result: ON). On the other hand, when the offset amount of CRE is negative or the ratio of the signal level of the serving cell thereof to the level of other cell interference is greater than a previously set threshold, boost determining section 301 determines that terminal 300 is not a terminal to which power boost is applicable (terminal located near the cell edge) and determines that power boost is not applied (determination result: OFF).

In this way, boost determining section 301 can determine whether or not to apply power boost more accurately than the case where only the offset amount of CRE is used.

[Determining Method 2]

According to determining method 2, boost determining section 301 determines whether or not terminal 300 is a terminal to which power boost is applicable based on a path loss with reference to the serving cell of terminal 300.

To be more specific, when a path loss between terminal 300 and the serving cell of terminal 300 is equal to or less than a previously set threshold, boost determining section 301 determines that the distance between the serving cell and terminal 300 is small (terminal 300 is located near the center of the cell). That is, when the path loss is equal to or less than a previously set threshold, boost determining section 301 determines that terminal 300 is unlikely to be a terminal to which power boost is applicable. In this case, boost determining section 301 determines that power boost is not applied (determination result: OFF).

On the other hand, when a path loss between terminal 300 and the serving cell of terminal 300 is greater than a previously set threshold, boost determining section 301 determines that the distance between the serving cell and terminal 300 is large (terminal 300 is located near the cell edge). That is, when the path loss is greater than a previously set threshold, boost determining section 301 determines that terminal 300 is likely to be a terminal to which power boost is applicable. In this case, boost determining section 301 determines that power boost is applied (determination result: ON).

Determining methods 1 and 2 in boost determining section 301 have been described so far.

As described above, terminal 300 determines whether or not to apply power boost to SRS based on the offset amount of CRE or a path loss with reference to the serving cell. Thus, power boost is applied to only terminals having a large performance improvement effect by applying CoMP. That is, power boost is not applied to SRS even in boost subframes for terminals having a small performance improvement effect by applying CoMP. It is thereby possible to limit increases in unnecessary power consumption or increases in other cell interference in the terminal while maintaining the effect of improving the system performance by applying CoMP.

Embodiment 5

In the present embodiment, transmission power of SRS is increased (power boosted) in boost subframes and an SRS code sequence (e.g., ZC sequence) used in boost subframes is made to vary from an SRS code sequence used in normal subframes.

Operations of base station 100 (FIG. 8) and terminal 200 (FIG. 9) according to the present embodiment will be described.

In LTE, a ZC (Zadoff-Chu) sequence is used as the SRS code sequence. In addition, a ZC sequence number used by terminal 200 is associated with a cell ID. For this reason, when the cell ID differs between a pico eNB and a macro eNB, the pico UE and the macro UE use different SRS ZC sequence numbers.

In this case, when SRS transmission resources (subframes and transmission bands) used in the pico UE and the macro UE are the same, inter-symbol interference increases. For this reason, the channel quality measurement accuracy deteriorates in the macro eNB that receives both SRSs.

When setting an SRS ZC sequence for terminal 200 (pico UE), SRS information determining section 101 of base station 100 sets a ZC sequence (ZC sequence number associated with the cell ID of the macro eNB) used for the macro cell in boost subframes. On the other hand, when setting an SRS ZC sequence for terminal 200 (pico UE), SRS information determining section 101 sets a ZC sequence (ZC sequence number associated with the cell ID of the pico eNB) used in the serving cell (pico eNB) of terminal 200 in normal subframes as in the conventional case.

That is, transmission control section 204 of terminal 200 (pico UE) sets a ZC sequence associated with the macro eNB for SRS in boost subframes and sets a ZC sequence associated with the serving cell of terminal 200 for SRS in normal subframes. Thus, terminal 200 uses different ZC sequences in boost subframes and normal subframes.

Figure 15:
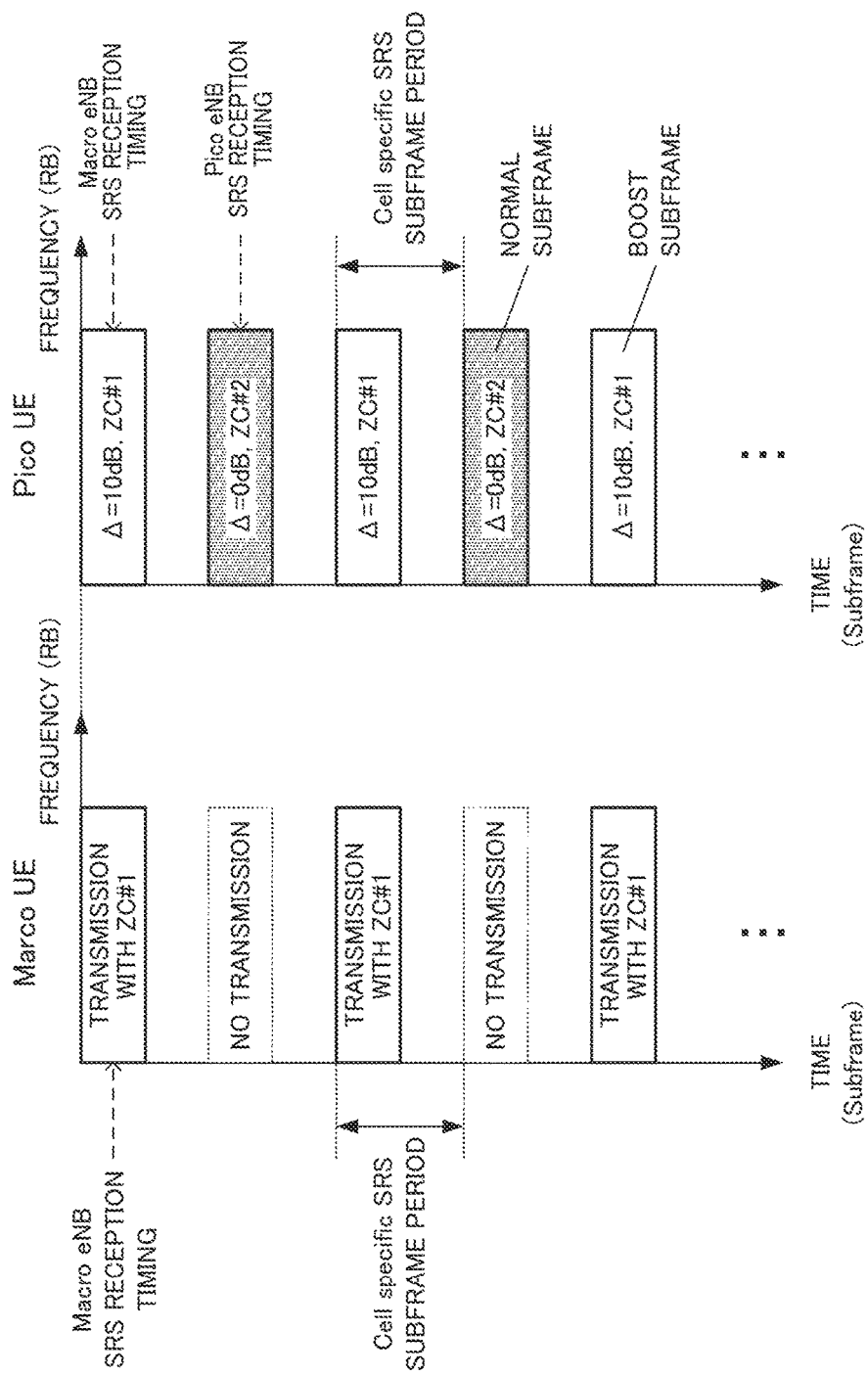
FIG. 15 illustrates a method for setting a code sequence used for SRS according to Embodiment 5 of the present disclosure.

For example, FIG. 15 illustrates a setting example of an SRS ZC sequence number used in each subframe for the pico UE (terminal 200). In FIG. 15, as in the case of setting method 1 in Embodiment 3, SRS transmission subframes of the macro UE (SRS reception timings of the macro eNB) are set in boost subframes. In FIG. 15, a ZC sequence number associated with the cell ID of the macro eNB is assumed to be ZC#1 and a ZC sequence number associated with the cell ID of the pico eNB which is the serving cell of the pico UE (terminal 200) is assumed to be ZC#2.

As shown in FIG. 15, terminal 200 does not apply power boost to SRS in normal subframes (Δ=0 [dB]), and assumes an SRS ZC sequence to be ZC#2. On the other hand, as shown in FIG. 15, terminal 200 applies power boost to SRS in boost subframes (Δ=10 [dB]) and assumes an SRS ZC sequence to be ZC#1.

As shown in FIG. 15, the macro UE and the pico UE use the same SRS ZC sequence number in boost subframes. Terminal 200 changes a CS (cyclic shift) number while using the same ZC sequence number as that of the macro UE in boost subframes. Even when both the macro UE and the pico UE transmit SRSs using the same SRS transmission resource, it is possible to orthogonalize SRSs between the macro UE and the pico UE, allowing the macro eNB to improve the channel quality measurement accuracy.

Embodiment 6

In the present embodiment, a method for setting an A-SRS-specific power offset value will be described in detail. In Embodiment 1, the method for changing a power offset value of SRS in accordance with an SRS transmission subframe has been described, whereas the present embodiment changes a power offset value of A-SRS in accordance with timing of indicating trigger information for prompting A-SRS transmission from a base station to a terminal (to be more specific, subframes in which PDCCH including trigger information is transmitted).

The present embodiment is based on the following viewpoints. That is, A-SRS or P-SRS transmission subframes are set only at predetermined periods (e.g., 5, 10, 20 ms) in each cell.

However, in the case of A-SRS, A-SRS trigger information (PDCCH) can be transmitted for each subframe.

Thus, associating timings of indicating A-SRS trigger information with a higher transmission frequency (PDCCH transmission subframes) with an A-SRS power offset value makes it easier for the base station to transmit A-SRS with appropriate transmission power directed to a desired cell in accordance with an instantaneous situation for the terminal.

Operations of base station 100 (FIG. 8) and terminal 200 (FIG. 9) according to the present embodiment will be described.

SRS information determining section 101 of base station 100 determines SRS-related information (SRS information) for target terminal 200. The SRS information includes parameters such as A-SRS transmission subframes, frequency band (transmission band), bandwidth (or the number of RBs), cyclic shift, transmission comb, the number of antennas, frequency-hopping pattern, SRS sequence number, and, in addition, information on the correspondence between subframes for indicating trigger information for prompting A-SRS transmission and the power boost amount during A-SRS transmission. Specifically, SRS information determining section 101 determines a plurality of different A-SRS power boost amounts (e.g., first power boost amount and second power boost amount) for an indication subframe number of A-SRS trigger information. SRS information determining section 101 then outputs setting information including the determined SRS information to coding and modulation section 102.

In terminal 200, transmission control section 204 controls A-SRS transmission power using an offset value corresponding to transmission power of a data signal, and transmitting section 206 transmits A-SRS with transmission power controlled by transmission control section 204. Here, transmission control section 204 controls A-SRS transmission power using a power boost amount uniquely determined in accordance with a subframe for indicating A-SRS trigger information. For example, transmission control section 204 controls A-SRS transmission power using a first power boost amount when the subframe for indicating the A-SRS trigger information is an odd number and using a second power boost amount when the indication subframe is an even number.

Figure 16:
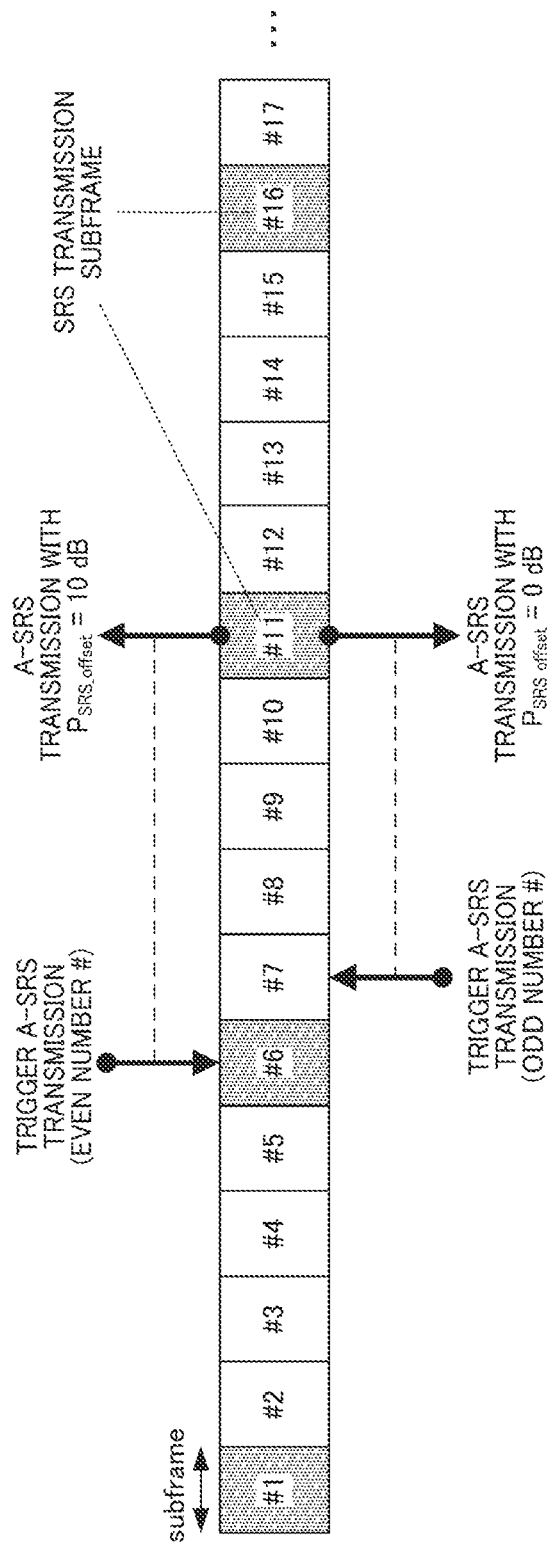
FIG. 16 illustrates a transmission power control method for SRS according to Embodiment 6 of the present disclosure.

A more specific example will be described with reference to FIG. 16. In FIG. 16, SRS transmission subframes are set at 5-ms periods of #1, 6, 11 and 16. When a subframe for indicating trigger information for prompting A-SRS transmission from base station 100 is an odd number, terminal 200 transmits A-SRS with a power offset amount of $P_{SRS\_OFFSET,c}(1)=0$ dB, whereas when the subframe is an even number, SRS information (correspondence information) that associates subframes with power boost amounts is indicated to terminal 200 so that terminal 200 can transmit A-SRS with a power offset amount of $P_{SRS\_OFFSET,c}(2)=10$ dB.

In this case, when a subframe for indicating A-SRS trigger information is #7 (odd number), terminal 200 transmits A-SRS with a power offset amount of $P_{SRS\_OFFSET,c}(1)=0$ dB in the first SRS transmission subframe located at the fourth subframe after #7 or after the fourth subframes (#11 or after #11). When the subframe for indicating A-SRS trigger information is #6 (even number), terminal 200 transmits A-SRS with a power offset amount of $P_{SRS\_OFFSET,c}(2)=10$ dB in the first SRS transmission subframe located at the fourth subframe after #6 or after the fourth subframe (#10 or after #11).

When base station 100 hopes to cause terminal 200 to transmits A-SRS toward the macro cell located at a long distance from terminal 200, base station 100 indicates trigger information to terminal 200 in even-numbered subframes, which allows terminal 200 to transmit A-SRS with large power. On the other hand, when base station 100 hopes to cause terminal 200 to transmits A-SRS toward the pico cell located at a short distance, base station 100 indicates trigger information to terminal 200 in odd-numbered subframes, which allows terminal 200 to transmit A-SRS with small power.

This makes it possible to transmit A-SRS with appropriate transmission power while limiting increases in power consumption of terminal 200 and increases in other cell interference. Furthermore, base station 100 changes a subframe for indicating trigger information to terminal 200 in order to transmit A-SRS with different power offset amounts in the same SRS transmission subframe, so that it is possible to limit increases in consumption of SRS transmission resources (subframes) of the cell.

In the aforementioned description, control is performed with two power boost amounts corresponding to timings of indicating A-SRS trigger information, but control may also be performed with three or more different power boost amounts.

In the aforementioned description, the power offset amount is assumed to be 0 dB when the subframe for indicating trigger information for prompting A-SRS transmission from base station 100 is an odd number, and the power offset amount is assumed to be 10 dB when the subframe is an even number. However, the power offset amount may be assumed to be 0 dB when the subframe for indicating trigger information for prompting A-SRS transmission from base station 100 is an even number, and the power offset amount may be assumed to be 10 dB when the subframe is an odd number.

Embodiment 7

In the present embodiment, in addition to control of A-SRS transmission power in accordance with timing of indicating A-SRS trigger information shown in Embodiment 6 (number of a subframe in which A-SRS trigger information is transmitted), A-SRS setting information (SRS sequence, bandwidth, frequency-hopping pattern or the like) is also controlled.

Operations of base station 100 (FIG. 8) and terminal 200 (FIG. 9) according to the present embodiment will be described.

As described above, when SRS transmission resources (subframes and transmission bands) used in the pico UE and the macro UE are the same but SRS ZC sequence numbers used by the pico UE and the macro UE are different, inter-code interference increases. For this reason, the channel quality measurement accuracy deteriorates in the macro eNB that receives both SRSs.

Thus, SRS information determining section 101 of base station 100 not only controls a plurality of different power boost amounts in accordance with the timing of indicating A-SRS trigger information shown in Embodiment 6, but also controls an A-SRS ZC sequence. That is, when transmitting A-SRS to a macro cell at a long distance, SRS information determining section 101 causes terminal 200 to transmit A-SRS with large power using an A-SRS ZC sequence used for the macro cell. On the other hand, when hoping to cause terminal 200 to transmit A-SRS to a pico cell at a small distance, SRS information determining section 101 causes terminal 200 to transmit A-SRS with small power using an A-SRS ZC sequence used for the pico cell.

For example, when the subframe for indicating trigger information for prompting A-SRS transmission from base station 100 is an odd number, terminal 200 transmits A-SRS with a power offset amount of $P_{SRS\_OFFSET,c}(1)=0$ dB using a sequence of ZC#1 used in a pico cell (sequence specific to the serving cell of terminal 200). Meanwhile, when the subframe for indicating trigger information for prompting A-SRS transmission from base station 100 is an even number, terminal 200 transmits A-SRS with a power offset amount of $P_{SRS\_OFFSET,c}(2)=10$ dB using a sequence of ZC#2 used in a macro cell (sequence specific to the macro cell).

In addition to the effects obtained in Embodiment 6, common A-SRS transmission timings are used between coordinated cells (that is, control is performed on the power boost amount and A-SRS ZC sequence in accordance with the above subframe number between coordinating cells as common rules), which in turn makes it possible to realize orthogonalization by CS using the same ZC sequence number and thus to improve the receiving quality.

A-SRS setting information other than the ZC sequence may be controlled likewise. For example, controlling the bandwidth of A-SRS or a frequency-hopping pattern to set values used in the transmission target cell simultaneously with controlling the power boost amount, makes it possible to realize inter-cell coordination that orthogonalizes A-SRSs transmitted from a plurality of cells in the frequency domain.

A case has been described above where terminal 200 uses a sequence of ZC#1 used in the pico cell when a subframe for indicating trigger information for prompting A-SRS transmission from base station 100 is an odd number and uses a sequence of ZC#2 used in the macro cell when the subframe is an even number. However, terminal 200 may also use a sequence of ZC#1 used in the pico cell when a subframe for indicating trigger information for prompting A-SRS transmission from base station 100 is an even number and use a sequence of ZC#2 used in the macro cell when the subframe is an odd number.

The embodiments of the present disclosure have been described so far.

Other Embodiments (1) In the above embodiments, SRS transmitted by terminal 200 may be P-SRS or A-SRS. Regardless of whether SRS is P-SRS or A-SRS, effects similar to those obtained in the above embodiments can be achieved.

(2) In each of the embodiments, a description has been provided with antennas, but the present disclosure can be applied to antenna ports in the same manner.

The term "antenna port" refers to a logical antenna including one or more physical antennas. In other words, the term "antenna port" does not necessarily refer to a single physical antenna, and may sometimes refer to an antenna array including a plurality of antennas, and/or the like.

For example, 3GPP LTE does not specify the number of physical antennas forming an antenna port, but specifies an antenna port as a minimum unit allowing base stations to transmit different reference signals.

In addition, an antenna port may be specified as a minimum unit to be multiplied by a precoding vector weighting.

(3) In the each of the embodiments, a description has been provided using an example in which the present disclosure is implemented by hardware, but the present disclosure may also be implemented by software in cooperation with hardware.

The functional blocks used in the description of each of the embodiments may typically be implemented as an LSI, which is an integrated circuit. The functional blocks may be formed as individual chips, or some of or all of the functional blocks may be integrated into a single chip. The term "LSI" is used herein, but the terms "IC," "system LSI," "super LSI," or "ultra LSI" may also be adopted depending on the degree of integration.

In addition, the circuit integration does not have to be achieved using an LSI and may be achieved using a dedicated circuit or a general-purpose processor other than an LSI. A field programmable gate array (FPGA), which is programmable after LSI manufacturing, or a reconfigurable processor which allows reconfiguration of connections and settings of circuit cells in an LSI after LSI manufacturing may be used.

Should a circuit integration technology replacing LSI appear as a result of advancements in semiconductor technology or other derivative technology, the functional blocks could be integrated using such a technology. Biotechnology applications, and/or the like, are conceivable prospects.

The disclosures of the specifications, drawings, and abstracts included in Japanese Patent Application No. 2011-154885, filed on Jul. 13, 2011 and Japanese Patent Application No. 2012-102744 filed on Apr. 27, 2012, are incorporated herein by reference in their entirety.

INDUSTRIAL APPLICABILITY

The present disclosure is useful in making it possible to appropriately select transmission points when applying CoMP and to improve the system performance while limiting increases in power consumption of a terminal and increases in other cell interference.

REFERENCE SIGNS LIST

100 Base station
101 SRS information determining section
102 Coding and modulation section
103 Transmission processing section
104, 206 Transmitting section
105, 201 Antenna
106, 202 Receiving section
107, 203 Reception processing section
108 Channel quality measuring section
109 CoMP control section
200, 300 Terminal
204, 302 Transmission control section
205 SRS generating section
301 Boost determining section

The invention claimed is:

1. A terminal apparatus comprising:
a transmission controller which, in operation, controls a transmission power of a sounding reference signal (SRS) using an offset value; and
a transmitter which, in operation, transmits the SRS using the controlled transmission power, wherein
the offset value used to control the transmission power is set within one of a first offset setting range having a first lower limit value and a first upper limit value and a second offset setting range having a second lower limit value and a second upper limit value, wherein a difference between the first lower limit value and the second lower limit value is equal to a difference between the first upper limit value and the second upper limit value,
a step width of the offset values within the first offset setting range equals a step width of the offset values within the second offset setting range, and
the SRS is a periodic SRS (P-SRS) or an aperiodic SRS (A-SRS).

2. The terminal apparatus according to claim 1, wherein the first and second offset setting ranges are set for the P-SRS and for the A-SRS, respectively.

3. The terminal apparatus according to claim 1, wherein a bit length of the offset value within the first offset setting range equals a bit length of the offset value within the second offset setting range.

4. The terminal apparatus according to claim 1, wherein the offset value is included in higher layer control information.

5. The terminal apparatus according to claim 1, wherein the second offset setting range is used when a path loss between the terminal apparatus and a serving cell exceeds a predetermined value.

6. The terminal apparatus according to claim 1, wherein the first offset setting range is used during transmission to a serving cell.

7. A communication method implemented by a terminal apparatus, the method comprising:
controlling a transmission power of a sounding reference signal (SRS) using an offset value; and
transmitting the SRS using the controlled transmission power, wherein
the offset value used to control the transmission power is set within one of a first offset setting range having a first lower limit value and a first upper limit value and a second offset setting range having a second lower limit value and a second upper limit value, wherein a difference between the first lower limit value and the second lower limit value is equal to a difference between the first upper limit value and the second upper limit value,
a step width of the offset values within the first offset setting range equals a step width of the offset values within the second offset setting range, and
the SRS is a periodic SRS (P-SRS) or an aperiodic SRS (A-SRS).

8. The communication method according to claim 7, wherein the first and second offset setting ranges are set for the P-SRS and for the A-SRS, respectively.

9. The communication method according to claim 7, wherein a bit length of the offset value within the first offset setting range equals a bit length of the offset value within the second offset setting range.

10. The communication method according to claim 7, further comprising receiving the offset value as higher layer control information.

11. The communication method according to claim 7, wherein the offset value is selected from the second offset setting range when a path loss between the terminal apparatus and a serving cell exceeds a predetermined value.

12. The communication method according to claim 7, wherein the offset value is selected from the first offset setting range during transmission from the terminal apparatus to a serving cell.

13. An integrated circuit that controls a process performed at a terminal apparatus, the process comprising:
controlling a transmission power of a sounding reference signal (SRS) using an offset value; and
transmitting the SRS using the controlled transmission power, wherein
the offset value used to control the transmission power is set within one of a first offset setting range having a first lower limit value and a first upper limit value and a second offset setting range having a second lower limit value and a second upper limit value, wherein a difference between the first lower limit value and the second lower limit value is equal to a difference between the first upper limit value and the second upper limit value,
a step width of the offset values within the first offset setting range equals a step width of the offset values within the second offset setting range, and
the SR S is a periodic SR S (P-SRS) or an aperiodic SR S (A-SRS).

14. The integrated circuit according to claim 13, wherein the first and second offset setting ranges are set for the P-SRS and for the A-SRS, respectively.

15. The integrated circuit according to claim 13, wherein a bit length of the offset value within the first offset setting range equals a bit length of the offset value within the second offset setting range.

16. The integrated circuit according to claim 13, wherein the process further comprises receiving the offset value as higher layer control information.

17. The integrated circuit according to claim 13, wherein the offset value is selected from the second offset setting range when a path loss between the terminal apparatus and a serving cell exceeds a predetermined value.

18. The integrated circuit according to claim 13, wherein the offset value is selected from the first offset setting range during transmission from the terminal apparatus to a serving cell.

* * * * *